US012612000B2

(12) United States Patent
Miller et al.

(10) Patent No.: US 12,612,000 B2
(45) Date of Patent: Apr. 28, 2026

(54) ROUTE PLANNING BASED CONTROL OF A REFUSE VEHICLE HYDRAULIC SYSTEM

(71) Applicant: Oshkosh Corporation, Oshkosh, WI (US)

(72) Inventors: Amanda Miller, Oshkosh, WI (US); Greg Steffens, Oshkosh, WI (US); Aaron Fisher, Oshkosh, WI (US); Chris Mills, Oshkosh, WI (US); Jeff Verhagen, Oshkosh, WI (US); Michael Bolton, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 329 days.

(21) Appl. No.: 18/111,137

(22) Filed: Feb. 17, 2023

(65) Prior Publication Data

US 2023/0312237 A1 Oct. 5, 2023

Related U.S. Application Data

(60) Provisional application No. 63/326,142, filed on Mar. 31, 2022, provisional application No. 63/326,148, (Continued)

(51) Int. Cl.
B60R 16/033 (2006.01)
B65F 3/02 (2006.01)
(Continued)

(52) U.S. Cl.
CPC .............. B60R 16/033 (2013.01); B65F 3/02 (2013.01); B65F 3/14 (2013.01); B65F 3/20 (2013.01);
(Continued)

(58) Field of Classification Search
CPC ..................................... B65F 3/02; B65F 3/14
See application file for complete search history.

(56) References Cited

U.S. PATENT DOCUMENTS 3,654,854 A 4/1972 Cook et al.
4,050,594 A 9/1977 Gollnick
(Continued)

FOREIGN PATENT DOCUMENTS

CN 103148064 A 6/2013
CN 111846716 A 10/2020
(Continued)

OTHER PUBLICATIONS https://info.macktrucks.com/refuse-revolution; "Welcome to the refuse revolution. Mack LR Electric." Retrieved on Mar. 21, 2023.
(Continued)

*Primary Examiner* — Stephanie T Su
(74) *Attorney, Agent, or Firm* — FOLEY & LARDNER LLP

(57) ABSTRACT

A refuse vehicle includes an electric motor powered by a battery, a hydraulic pump driven by the electric motor, a hydraulic actuator powered by the hydraulic pump, and one or more processing circuits being configured to: determine a location of the refuse vehicle including a global position system coordinate, determine a position on a route map using the location, control the hydraulic actuator based on the position on the route map, determine a state of charge of the battery and a threshold for the state of charge below which operation of the electric motor, the hydraulic pump, or the hydraulic actuator is adjusted, and dynamically update the threshold based on the position on the route map or a weight of refuse in a refuse compartment.

20 Claims, 25 Drawing Sheets

Related U.S. Application Data filed on Mar. 31, 2022, provisional application No. 63/326,124, filed on Mar. 31, 2022, provisional application No. 63/326,146, filed on Mar. 31, 2022, provisional application No. 63/325,681, filed on Mar. 31, 2022.

(51) Int. Cl.

| | |
|---|---|
| *B65F 3/14* | (2006.01) |
| *B65F 3/20* | (2006.01) |
| *F15B 9/03* | (2006.01) |
| *F15B 13/04* | (2006.01) |
| *F15B 13/044* | (2006.01) |
| *F15B 15/18* | (2006.01) |
| *F15B 21/02* | (2006.01) |

(52) U.S. Cl.
CPC .............. *F15B 9/03* (2013.01); *F15B 13/044* (2013.01); *F15B 15/18* (2013.01); *F15B 21/02* (2013.01); *B65F 2003/025* (2013.01); *F15B 13/0402* (2013.01); *F15B 2211/20515* (2013.01); *F15B 2211/20546* (2013.01); *F15B 2211/20576* (2013.01); *F15B 2211/255* (2013.01); *F15B 2211/2656* (2013.01)

(56) References Cited

U.S. PATENT DOCUMENTS

| | | | |
|---|---|---|---|
| 4,359,931 A | 11/1982 | Palmersheim et al. | |
| 4,437,385 A | 3/1984 | Kramer et al. | |
| 4,522,551 A | 6/1985 | Henneberry | |
| 4,642,019 A | 2/1987 | Sutton | |
| 6,186,044 B1 | 2/2001 | Hajek et al. | |
| 7,028,599 B2 | 4/2006 | Linser | |
| 7,070,381 B2 | 7/2006 | Khan et al. | |
| 9,145,905 B2 | 9/2015 | Hou | |
| 9,494,170 B2 | 11/2016 | Hou | |
| 9,879,404 B2 | 1/2018 | Schroeder et al. | |
| 10,280,592 B2 | 5/2019 | Takahashi et al. | |
| 11,136,187 B1 | 10/2021 | Koga et al. | |
| 11,433,993 B2 | 9/2022 | Allen | |
| 2002/0157528 A1 | 10/2002 | Yoshino | |
| 2003/0041596 A1 | 3/2003 | Flerchinger et al. | |
| 2004/0002794 A1 | 1/2004 | Pillar et al. | |
| 2005/0113996 A1 | 5/2005 | Pillar et al. | |
| 2005/0234622 A1 | 10/2005 | Pillar et al. | |
| 2006/0071645 A1 | 4/2006 | Bolton | |
| 2007/0166168 A1 | 7/2007 | Vigholm et al. | |
| 2008/0114513 A1 | 5/2008 | Pillar et al. | |
| 2008/0302099 A1 | 12/2008 | Vigholm et al. | |
| 2009/0050222 A1 | 2/2009 | Jackson et al. | |
| 2012/0180470 A1 | 7/2012 | Schroeder et al. | |
| 2015/0059568 A1 | 3/2015 | Williamson et al. | |
| 2015/0210313 A1 | 7/2015 | Sears et al. | |
| 2015/0224845 A1* | 8/2015 | Anderson | F03G 7/081 701/37 |
| 2016/0333897 A1 | 11/2016 | Kleitsch | |
| 2017/0306989 A1 | 10/2017 | Coolidge | |
| 2018/0252567 A1* | 9/2018 | Buteau | G01M 15/044 |
| 2019/0185077 A1 | 6/2019 | Smith et al. | |
| 2020/0290237 A1 | 9/2020 | Steffens et al. | |
| 2020/0291846 A1 | 9/2020 | Steffens et al. | |
| 2020/0316816 A1 | 10/2020 | Messina et al. | |
| 2020/0317083 A1 | 10/2020 | Messina et al. | |
| 2020/0346547 A1 | 11/2020 | Rocholl et al. | |
| 2020/0346657 A1* | 11/2020 | Clifton | B65F 3/04 |
| 2020/0398670 A1 | 12/2020 | Rocholl et al. | |
| 2021/0031649 A1 | 2/2021 | Messina et al. | |
| 2021/0088036 A1 | 3/2021 | Schubart et al. | |
| 2021/0121340 A1 | 4/2021 | Malcolm et al. | |
| 2021/0143663 A1 | 5/2021 | Bolton | |
| 2021/0276423 A1 | 9/2021 | Lombardo et al. | |
| 2021/0276450 A1 | 9/2021 | Eshleman et al. | |
| 2021/0276847 A1 | 9/2021 | Neubauer et al. | |
| 2021/0276848 A1 | 9/2021 | Miller et al. | |
| 2021/0292086 A1 | 9/2021 | Mahan et al. | |
| 2021/0339632 A1 | 11/2021 | Rocholl et al. | |
| 2021/0369515 A1 | 12/2021 | Malcolm et al. | |
| 2021/0380179 A1 | 12/2021 | Smith et al. | |
| 2022/0000686 A1 | 1/2022 | Malcolm et al. | |
| 2022/0072736 A1 | 3/2022 | Steffens et al. | |
| 2022/0097527 A1 | 3/2022 | Koga et al. | |
| 2022/0097961 A1 | 3/2022 | Koga et al. | |
| 2022/0097964 A1 | 3/2022 | Koga et al. | |
| 2022/0118854 A1 | 4/2022 | Davis et al. | |
| 2022/0135385 A1 | 5/2022 | Lombardo et al. | |
| 2022/0185582 A1 | 6/2022 | Koga et al. | |
| 2022/0204332 A1 | 6/2022 | Miller et al. | |
| 2022/0211560 A1 | 7/2022 | Malcolm et al. | |
| 2022/0234873 A1 | 7/2022 | Miller et al. | |
| 2022/0306074 A1* | 9/2022 | Kono | B60W 30/18127 |
| 2022/0364328 A1 | 11/2022 | Jung et al. | |
| 2022/0410688 A1* | 12/2022 | Parker | B60K 15/03006 |
| 2023/0046193 A1 | 2/2023 | Schubart et al. | |
| 2023/0047110 A1 | 2/2023 | Smith et al. | |
| 2023/0047430 A1 | 2/2023 | Smith et al. | |
| 2023/0048292 A1 | 2/2023 | Smith et al. | |
| 2023/0048621 A1 | 2/2023 | Smith et al. | |
| 2023/0049763 A1 | 2/2023 | Messina et al. | |
| 2023/0052557 A1 | 2/2023 | Smith et al. | |
| 2023/0052626 A1 | 2/2023 | Smith et al. | |
| 2023/0052923 A1 | 2/2023 | Smith et al. | |
| 2023/0057525 A1 | 2/2023 | Smith et al. | |
| 2023/0070279 A1 | 3/2023 | Wheeler et al. | |
| 2023/0070769 A1 | 3/2023 | Wheeler et al. | |
| 2023/0074504 A1 | 3/2023 | Ellifson et al. | |

FOREIGN PATENT DOCUMENTS

| | | | |
|---|---|---|---|
| CN | 113753445 A | 12/2021 | |
| JP | 2008-057611 A | 3/2008 | |
| JP | 4263072 B2 | 5/2009 | |
| WO | WO-2014/054326 A1 | 4/2014 | |
| WO | WO-2014/207474 A2 | 12/2014 | |
| WO | WO-2020/196871 A1 | 10/2020 | |

OTHER PUBLICATIONS https://www.youtube.com/watch?v=NQFtAnm7D-c; "All-New Mack LR Electric Garbage Truck." Retrieved on Mar. 21, 2023.

* cited by examiner

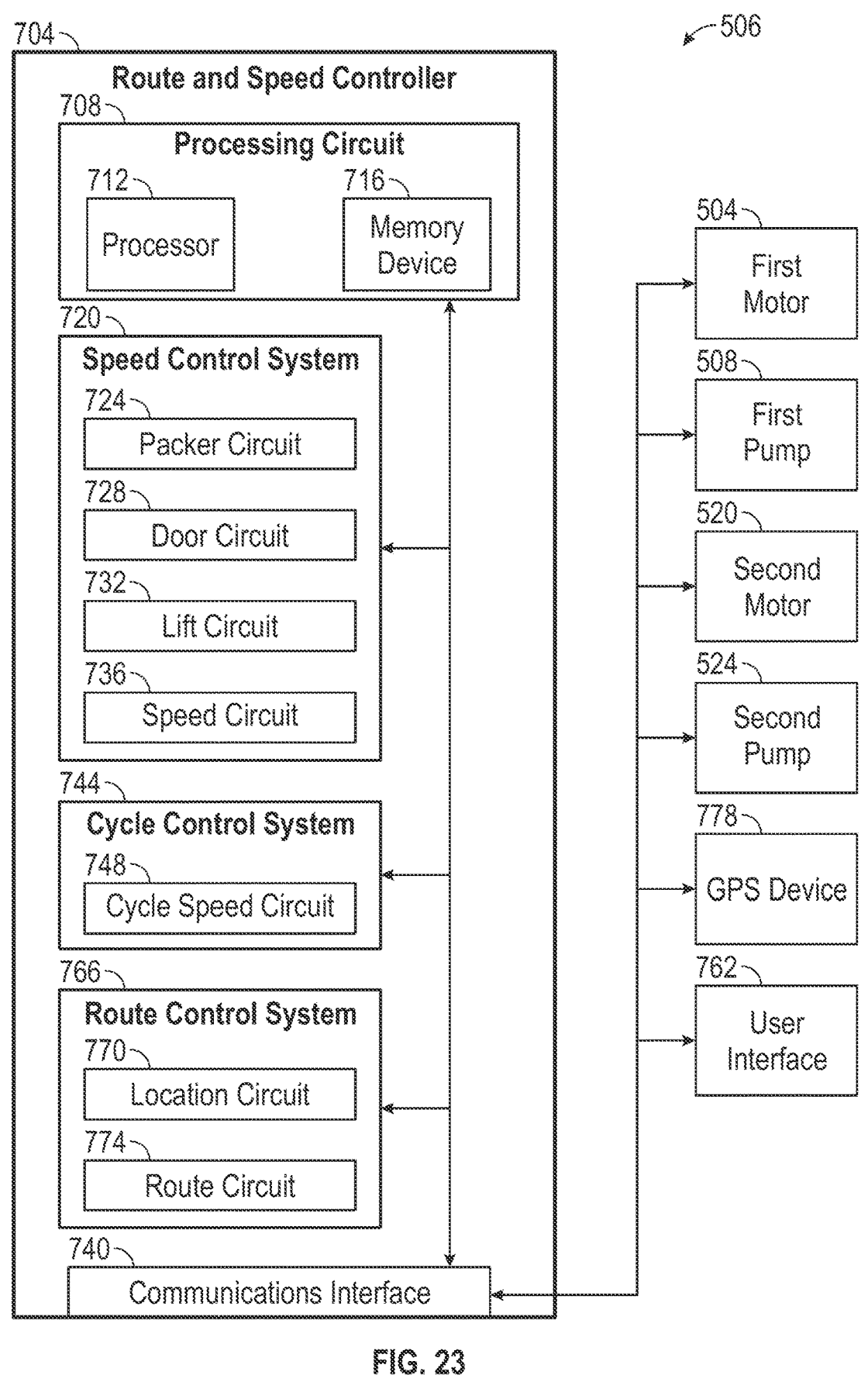

704 ~

Route and Speed Controller

708 ~
Processing Circuit

712 ~
Processor

716 ~
Memory Device

720 ~
Speed Control System

724 ~
Packer Circuit

728 ~
Door Circuit

732 ~
Lift Circuit

736 ~
Speed Circuit

744 ~
Cycle Control System

748 ~
Cycle Speed Circuit

766 ~
Route Control System

770 ~
Location Circuit

774 ~
Route Circuit

740 ~
Communications Interface

~ 506

504 ~
First Motor

508 ~
First Pump

520 ~
Second Motor

524 ~
Second Pump

778 ~
GPS Device

762 ~
User Interface

FIG. 23

ROUTE PLANNING BASED CONTROL OF A REFUSE VEHICLE HYDRAULIC SYSTEM

CROSS-REFERENCE TO RELATED APPLICATIONS

This application claims priority to and the benefit of U.S. Provisional Patent Application No. 63/326,146, filed on Mar. 31, 2022, U.S. Provisional Patent Application No. 63/326,148, filed on Mar. 31, 2022, U.S. Provisional Patent Application No. 63/326,124, filed on Mar. 31, 2022, U.S. Provisional Patent Application No. 63/325,681, filed on Mar. 31, 2022, and U.S. Provisional Patent Application No. 63/326,142, filed on Mar. 31, 2022, the entire contents of which are incorporated herein by reference.

BACKGROUND

The present disclosure relates generally to vehicles. More specifically, the present disclosure relates to a refuse vehicle that include electrically driven hydraulic components.

SUMMARY

One embodiment relates to a refuse vehicle that includes an electric motor powered by a battery, a hydraulic pump driven by the electric motor, a hydraulic actuator powered by the hydraulic pump, and one or more processing circuits comprising one or more memory devices coupled to one or more processors, the one or more memory devices configured to store instructions thereon that, when executed by the one or more processors, cause the one or more processors to: determine a location of the refuse vehicle including a global position system coordinate, determine a position on a route map using the location, determine a state of charge of the battery and a threshold for the state of charge below which operation of the electric motor, the hydraulic pump, or the hydraulic actuator is adjusted, and dynamically update the threshold based on the position on the route map or a weight of refuse in a refuse compartment.

Another embodiment relates to a refuse vehicle that includes an electric motor powered by a battery, a hydraulic pump driven by the electric motor, a hydraulic actuator powered by the hydraulic pump, and one or more processing circuits comprising one or more memory devices coupled to one or more processors, the one or more memory devices configured to store instructions thereon that, when executed by the one or more processors, cause the one or more processors to: determine a location of the refuse vehicle including a global position system coordinate, determine a position on a route map using the location, recognize stored stop parameters based on the position on the route map, and control the hydraulic actuator based on the position on the route map and adjusting the hydraulic actuator to achieve stop parameters.

Another embodiment relates to a refuse vehicle that includes an electric motor powered by a battery, a hydraulic pump driven by the electric motor, a hydraulic actuator powered by the hydraulic pump, and one or more processing circuits comprising one or more memory devices coupled to one or more processors, the one or more memory devices configured to store instructions thereon that, when executed by the one or more processors, cause the one or more processors to: determine a position on a route map using the location, determine a state of charge of the battery, increase a cycle time of the hydraulic actuator when the state of charge is less than a threshold and based on the position on the route map.

Another embodiment relates to a refuse vehicle that includes a first electric motor powered by a battery, a first hydraulic pump driven by the first electric motor, a packer actuator powered by the first hydraulic pump, a second electric motor powered by the battery, a second hydraulic pump driven by the second electric motor, a door actuator powered by the second hydraulic pump, and a lift actuator driven by the second hydraulic pump.

Another embodiment relates to a refuse vehicle that includes a first electric motor powered by a battery, a first hydraulic pump driven by the first electric motor, a packer actuator powered by the first hydraulic pump, a second electric motor powered by the battery, a second hydraulic pump driven by the second electric motor, a door actuator powered by the second hydraulic pump, a third electric motor powered by the battery, a third hydraulic pump driven by the third electric motor, and a lift actuator driven by the third hydraulic pump.

Another embodiment relates to a refuse vehicle that includes a storage compartment including a front post adjacent a front wall, a rear post adjacent a rear wall, a mid post between the front post and the rear post, a hopper volume defined between the front post and the mid post, and a storage volume defined between the mid post and the rear post. The refuse vehicle also includes a hydraulic system cavity defined in the front wall, a first electric motor positioned within the hydraulic system cavity and powered by a battery, a first hydraulic pump positioned within the hydraulic system cavity and driven by the first electric motor, a packer actuator powered by the first hydraulic pump, a second electric motor positioned within the hydraulic system cavity and powered by the battery, a second hydraulic pump positioned within the hydraulic system cavity and driven by the second electric motor, a door assembly, and a grabber arm assembly. The door assembly includes a door system manifold positioned outside the hydraulic system cavity and rearward of the mid post, the door system manifold receiving a flow of hydraulic fluid from the second hydraulic pump, and a door actuator powered via the door system manifold. The grabber arm assembly includes an arm assembly manifold positioned outside the hydraulic system cavity and receiving a flow of hydraulic fluid from the second hydraulic pump, and a reach actuator powered via the arm assembly manifold.

Another embodiment relates to a refuse vehicle that includes an electric motor powered by a battery, a hydraulic pump driven by the electric motor, a hydraulic actuator powered by the hydraulic pump, and one or more processing circuits comprising one or more memory devices coupled to one or more processors, the one or more memory devices configured to store instructions thereon that, when executed by the one or more processors, cause the one or more processors to: determine a target cycle time for the hydraulic actuator, and control a speed of the electric motor to achieve the target cycle time.

Another embodiment relates to a refuse vehicle that includes an electric motor, a hydraulic pump driven by the electric motor, a hydraulic actuator powered by the hydraulic pump, and one or more processing circuits comprising one or more memory devices coupled to one or more processors, the one or more memory devices configured to store instructions thereon that, when executed by the one or more processors, cause the one or more processors to: receive route information, determine a target cycle time for the hydraulic actuator based on the route information so that the hydraulic actuator is ready to be employed upon arrival at a next stop, and control a speed of the electric motor to achieve the target cycle time.

Another embodiment relates to a refuse vehicle that includes a first electric motor, a first hydraulic pump driven by the first electric motor, a packer actuator powered by the first hydraulic pump, a second electric motor, a second hydraulic pump driven by the second electric motor, a grabber assembly actuator driven by the second hydraulic pump, and one or more processing circuits comprising one or more memory devices coupled to one or more processors, the one or more memory devices configured to store instructions thereon that, when executed by the one or more processors, cause the one or more processors to: determine a packer target cycle time for the packer actuator, determine a grabber target cycle time for the grabber assembly, control a speed of the first electric motor to achieve the packer target cycle time, and control a speed of the second electric motor to achieve the grabber target cycle time.

Another embodiment relates to a refuse vehicle that includes an electric motor powered by a battery, a hydraulic pump driven by the electric motor, a manifold including a plurality of electrically actuated solenoid valves receiving hydraulic power from the hydraulic pump, a hydraulic actuator powered by the hydraulic pump via the manifold, and one or more processing circuits comprising one or more memory devices coupled to one or more processors, the one or more memory devices configured to store instructions thereon that, when executed by the one or more processors, cause the one or more processors to: determine a load applied to the hydraulic actuator, operate the manifold to provide regenerative flow of hydraulic fluid to the hydraulic actuator when the load is less than a threshold load, and operate the manifold to provide non-regenerative flow of hydraulic fluid to the hydraulic actuator when the load is greater than or equal to the threshold load.

Another embodiment relates to a refuse vehicle that includes a storage compartment structured to house refuse, an electric motor powered by a battery, a hydraulic pump driven by the electric motor, a manifold including electrically actuated solenoid valves receiving hydraulic power from the hydraulic pump, a hydraulic packing actuator positioned in the storage compartment and powered by the hydraulic pump via the manifold, and one or more processing circuits comprising one or more memory devices coupled to one or more processors, the one or more memory devices configured to store instructions thereon that, when executed by the one or more processors, cause the one or more processors to: determine an amount of refuse stored in the storage container, operate the manifold to provide regenerative flow of hydraulic fluid to the hydraulic actuator when the amount of refuse is less than a threshold amount, and operate the manifold to provide non-regenerative flow of hydraulic fluid to the hydraulic actuator when the amount of refuse is greater than or equal to the threshold amount.

Another embodiment relates to a refuse vehicle that includes a storage compartment structured to house refuse, an electric motor powered by a battery, a hydraulic pump driven by the electric motor, a hydraulic packing actuator positioned in the storage compartment and powered by the hydraulic pump, and a manifold positioned hydraulically between the hydraulic pump and the hydraulic packing actuator. The manifold includes a bore side pressure logic valve, a bore side relief logic valve, a rod side regeneration logic valve, a rod side relief logic valve, and a plurality of electrically actuated solenoid valves structured to control the logic valves to provide a regeneration mode and a non-regeneration mode.

Another embodiment relates to a refuse vehicle that includes an electric motor powered by a battery, a hydraulic pump driven by the electric motor, a hydraulic actuator powered by the hydraulic pump, and one or more processing circuits comprising one or more memory devices coupled to one or more processors, the one or more memory devices configured to store instructions thereon that, when executed by the one or more processors, cause the one or more processors to: determine a load of the hydraulic actuator, and control a speed of the electric motor driving the hydraulic pump to achieve the load.

Another embodiment relates to a refuse vehicle that includes a first electric motor powered by a battery, a first hydraulic pump driven by the first electric motor, a packer actuator powered by the first hydraulic pump, a second electric motor powered by the battery, a second hydraulic pump driven by the second electric motor, a door actuator powered by the second hydraulic pump, a lift actuator driven by the second hydraulic pump, and one or more processing circuits comprising one or more memory devices coupled to one or more processors, the one or more memory devices configured to store instructions thereon that, when executed by the one or more processors, cause the one or more processors to: determine a packer load of the packer actuator, control a speed of the first electric motor driving the first hydraulic pump to achieve the packer load, determine a door load of the door actuator, determine a lift load of the lift actuator, and control a speed of the second electric motor driving the second hydraulic pump to achieve the door load and the lift load.

Another embodiment relates to a refuse vehicle that includes a storage compartment including a front post adjacent a front wall, a rear post adjacent a rear wall, a mid post between the front post and the rear post, a hopper volume defined between the front post and the mid post, and a storage volume defined between the mid post and the rear post. The refuse vehicle also includes a hydraulic system cavity defined in the front wall, a first electric motor positioned within the hydraulic system cavity and powered by a battery, a first hydraulic pump positioned within the hydraulic system cavity and driven by the first electric motor, a packer actuator powered by the first hydraulic pump, a second electric motor positioned within the hydraulic system cavity and powered by the battery, a second hydraulic pump positioned within the hydraulic system cavity and driven by the second electric motor, a door assembly, a grabber arm assembly, and one or more processing circuits. The door assembly includes a door system manifold positioned outside the hydraulic system cavity and rearward of the mid post, the door system manifold receiving a flow of hydraulic fluid from the second hydraulic pump, and a door actuator powered via the door system manifold. The grabber arm assembly includes an arm assembly manifold positioned outside the hydraulic system cavity and receiving a flow of hydraulic fluid from the second hydraulic pump, and a reach actuator powered via the arm assembly manifold. The one or more processing circuits comprise one or more memory devices coupled to one or more processors, the one or more memory devices configured to store instructions thereon that, when executed by the one or more processors, cause the one or more processors to: determine a packer load of the packer actuator, control a speed of the first electric motor driving the first hydraulic pump to achieve the packer load, determine a door load of the door actuator, determine a reach load of the reach actuator, and control a speed of the second electric motor driving the second hydraulic pump to achieve the door load and the reach load.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 23 is a schematic representation of a control system of the two-motor, two-pump hydraulic system of FIG. 14, according to an exemplary embodiment.

DETAILED DESCRIPTION

Figure 1:
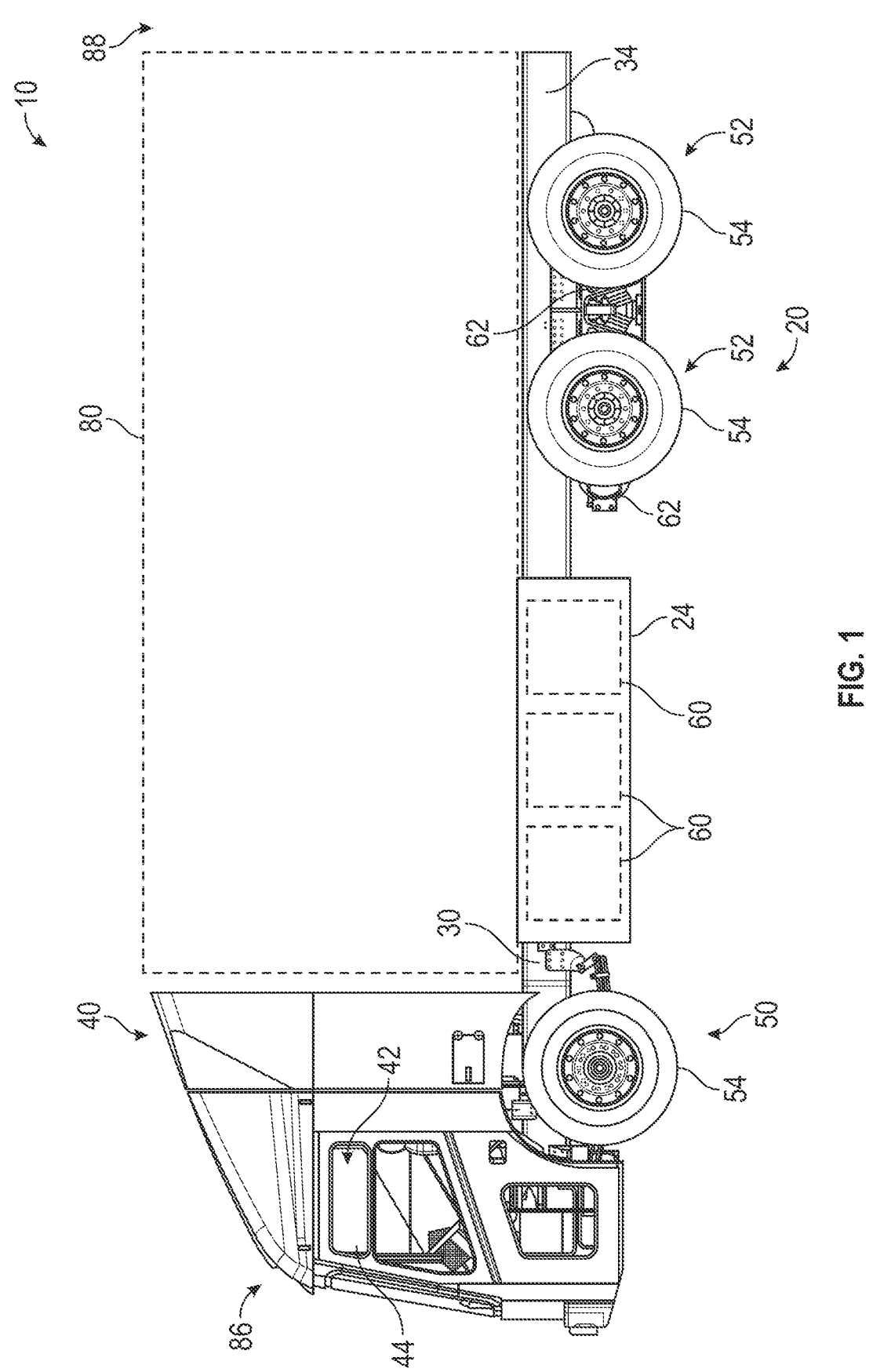
FIG. 1 is a left side view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes a hydraulic system that provides power to body functions of a refuse vehicle. The hydraulic system includes a first pump driven by a first electric motor, and a second pump driven by a second electric motor. The first pump provides hydraulic power to a packer assembly. In some embodiments, the first pump is dedicated to the packer assembly and does not provide hydraulic power to other functions of the refuse vehicle. The second pump provides hydraulic power to all other body functions of the refuse vehicle. For example, the second pump provides hydraulic power to a grabber/tipper arm and a tailgate. The first pump and the second pump are positioned on the refuse vehicle to minimize hydraulic hose length and the number of fittings and compensator valves required. The reduction of fittings, compensator valves, and hose length reduced the frictional losses of the system, thereby increasing overall efficiency.

According to another exemplary embodiment, the hydraulic system includes a first pump driven by a first electric motor, and a second pump driven by the first electric motor. The first pump provides hydraulic power to a packer assembly. In some embodiments, the first pump is dedicated to the packer assembly and does not provide hydraulic power to other functions of the refuse vehicle. The second pump provides hydraulic power to all other body functions of the refuse vehicle. The first pump and the second pump are positioned on the refuse vehicle to minimize hydraulic hose length and the number of fittings and compensator valves required. The first electric motor drives the first pump and the second pump and therefore both the first pump and the second pump are operated if any one of the first pump or the second pump are needed.

According to another exemplary embodiment, the hydraulic system includes a first pump driven by a first electric motor, a second pump driven by a second electric motor, and a third pump driven by a third electric motor. The first pump provides hydraulic power to a packer assembly. In some embodiments, the first pump is dedicated to the packer assembly and does not provide hydraulic power to other functions of the refuse vehicle. The second pump provides hydraulic power to a tailgate and a top door, and the third pump provides hydraulic power to a grabber/tipper assembly. In some embodiments, the second pump and the third pump can be arranged to provide different functionalities. For example, the second pump may provide hydraulic power to some functions of the grabber/tipper assembly (e.g., an arm reach function). The first pump, the second pump, and the third pump are positioned on the refuse vehicle to minimize hydraulic hose length and the number of fittings and compensator valves required.

According to another exemplary embodiment, the hydraulic system includes a first pump driven by a first electric motor, and a second pump driven coupled to the first electric motor by a clutched gear box. The first pump provides hydraulic power to a packer assembly. In some embodiments, the first pump is dedicated to the packer assembly and does not provide hydraulic power to other functions of the refuse vehicle. The second pump provides hydraulic power to all other body functions of the refuse vehicle and can be decoupled from the first electric motor by the clutched gearbox. The clutched gearbox can alter the speed of the second pump.

The arrangement of the vehicle can be customized with one, two, or three pumps, driven by one, two, or three electric motors and/or one or more gearboxes to provide a desirable blend of power efficiency and cost of installation. In some embodiments, a weighted average or score may be assigned to each configuration based on energy efficiency, cost, weight, control complexity, etc.

According to an exemplary embodiment, a vehicle includes a hydraulic system that provides power to a body function of a refuse vehicle. The hydraulic system includes a hydraulic pump driven by an electric motor. The hydraulic pump provides hydraulic power to a hydraulic actuator of the body function (e.g., a packer, an ejector, a grabber/tipper assembly, etc.). A controller is arranged in communication with the electric motor and the hydraulic pump and identifies a target cycle time of the hydraulic actuator. The controller operates the electric motor to achieve the target cycle time while displacement of the hydraulic pump is maintained constant. In some embodiments, the displacement of the hydraulic pump may be altered while the majority of hydraulic power control is provided by adjustment of the electric motor speed. Modification of the cycle time via motor speed control is significantly more efficient than adjustment via pump displacement. The controller varies the electric motor speed to minimize the change in displacement of the hydraulic pump. In some embodiments, the hydraulic actuator is a packer actuator and the motor speed is varied based on load of the packer actuator. The ability control cycle time via motor speed increases the overall efficiency of the vehicle operation and increases the useful life of power consumed by the vehicle (e.g., a battery).

According to an exemplary embodiment, a vehicle includes a hydraulic system that provides power to a body function of a refuse vehicle. The hydraulic system includes a packer assembly that compresses waste held in the vehicle. The packer assembly includes a hydraulic actuator and a hydraulic control system structured to operate the hydraulic actuator in a regeneration mode and in a non-regeneration or normal mode. In the regeneration mode, hydraulic fluid from a rod side of the hydraulic actuator is returned to a bore side of the hydraulic actuator. The regeneration mode provides a faster actuation of the hydraulic actuator but produces less force. In some embodiments, the hydraulic control system operates the hydraulic actuator in the regeneration mode when a hydraulic pressure at the bore side of the hydraulic actuator is below a threshold pressure. For example, the threshold pressure may be defined as a pressure at which the bore side and rod side force differential is equal to the packing force required of the hydraulic actuator. The use of a regeneration mode in a packer assembly provides a faster packing operation when the load is small and may provide overall energy efficiency during low load packing.

According to an exemplary embodiment, a vehicle includes a hydraulic system that provides power to a body function of a refuse vehicle. The hydraulic system includes an electric motor that drives a hydraulic pump to provide hydraulic power to one or more hydraulic actuators. The body function defines a cycle time (e.g., a packer arm extending and returning) of the hydraulic actuator. A large cycle time will consume less energy than a small cycle time. Hydraulic systems operate more efficient at lower speeds (e.g., overall energy consumed to perform the function is the same, but frictional losses are reduced). A controller is configured to control a motor speed of the electric motor and/or adjust displacement of the hydraulic pump based on route information. In some embodiments, the route information includes map data and determines a distance or a time of travel between containers to be collected. The map data can include global position coordinate (GPS) information, learned routes, platoon information (e.g., information received from other vehicles within a fleet or previous trips of the vehicle), locations status information historical information, etc. The cycle time can be determined by the controller based on the route information. For example, the cycle time can be maximized based on a projected time to the next stop on the route (e.g., a cycle time of 142 seconds, based on a distance, speed limit, traffic information, historical information, etc.). In some embodiments, the controller monitors a battery state of charge and derates the hydraulic system (e.g., increasing the cycle time) when the state of charge is less than or equal to a threshold state of charge. In some embodiments, the vehicle includes a user interface configured to receive a user input implementing a fast speed (e.g., a small cycle time) or a slow speed (e.g., a large cycle time). For example, when the slow speed is selected via the user interface, the cycle time may be maximized to improve overall system efficiency. In some embodiments, the controller can utilize the cycle time to aid in load shedding. Load shedding can be advantageous when the vehicle has high overall power demands. For example, while operating multiple components of the vehicle (e.g., a grabber arm, a packer, a tailgate, motive power, etc.) the cycle time can be increased to reduce the instantaneous power draw of the hydraulic system. Maximizing the cycle time increases the overall vehicle efficiency and reduces the demand on battery power.

According to an exemplary embodiment, a vehicle includes body functions (e.g., a packer, a grabber arm, a dump system, a tailgate), a drivetrain or driveline, and an energy storage system including batteries. A controller is configured to control operation of the vehicle based on route information. In some embodiments, the controller controls actuators of a grabber or tipper system to adjust fork or grabber arm settings based on the route information. For example, the controller can automatically set a height and a width of forks based on route information (e.g., GPS coordinates, historical information, defined parameters tied to location information, etc.). In some embodiments, the fork height and/or width can be automatically or manually (e.g., via a user interface or button) recorded in association with each location/customer. In other words, the controller can learn route information over time. In some embodiments, the controller automatically controls the forks to a position associated with a current or upcoming location. In some embodiments, onboard cameras, image processing, artificial intelligence engines, or other sensors determine a fork height/width. In some embodiments, the onboard cameras, sensors, and processing systems automatically adjust the forks to engage a refuse container. In some embodiments, the controller can adjust operation of the vehicle based on data acquired during operation. For example, the controller may assign a separate score to each driver, route, and vehicle, then determine optimized groupings of driver, vehicle, and route based on compatibility of scores to maximize a probability that the vehicle will be able to complete route without fully depleting a state of charge of the batteries. In some embodiments, the controller can adjust a capability of the vehicle to reduce non-essential battery consumption based on a current state of charge, driver habits, traffic, parameters of remaining route, and/or ambient conditions to ensure that the current route can be completed. In some embodiments, the controller shuts down or disables non-essential body functions (e.g., arm functions) to inhibit the driver from collecting additional containers/waste if the state of the charge of the battery falls below a threshold. Disabling non-essential body functions can provide sufficient battery power to (a) return to landfill, (b) dump the current load, and (c) increase driving range. Integration of the controller with the hydraulic system allows for the use of route information to improve the effectiveness of the operation of the vehicle and improve the vehicle ability to complete intended routes.

Overall Vehicle

Figure 2:
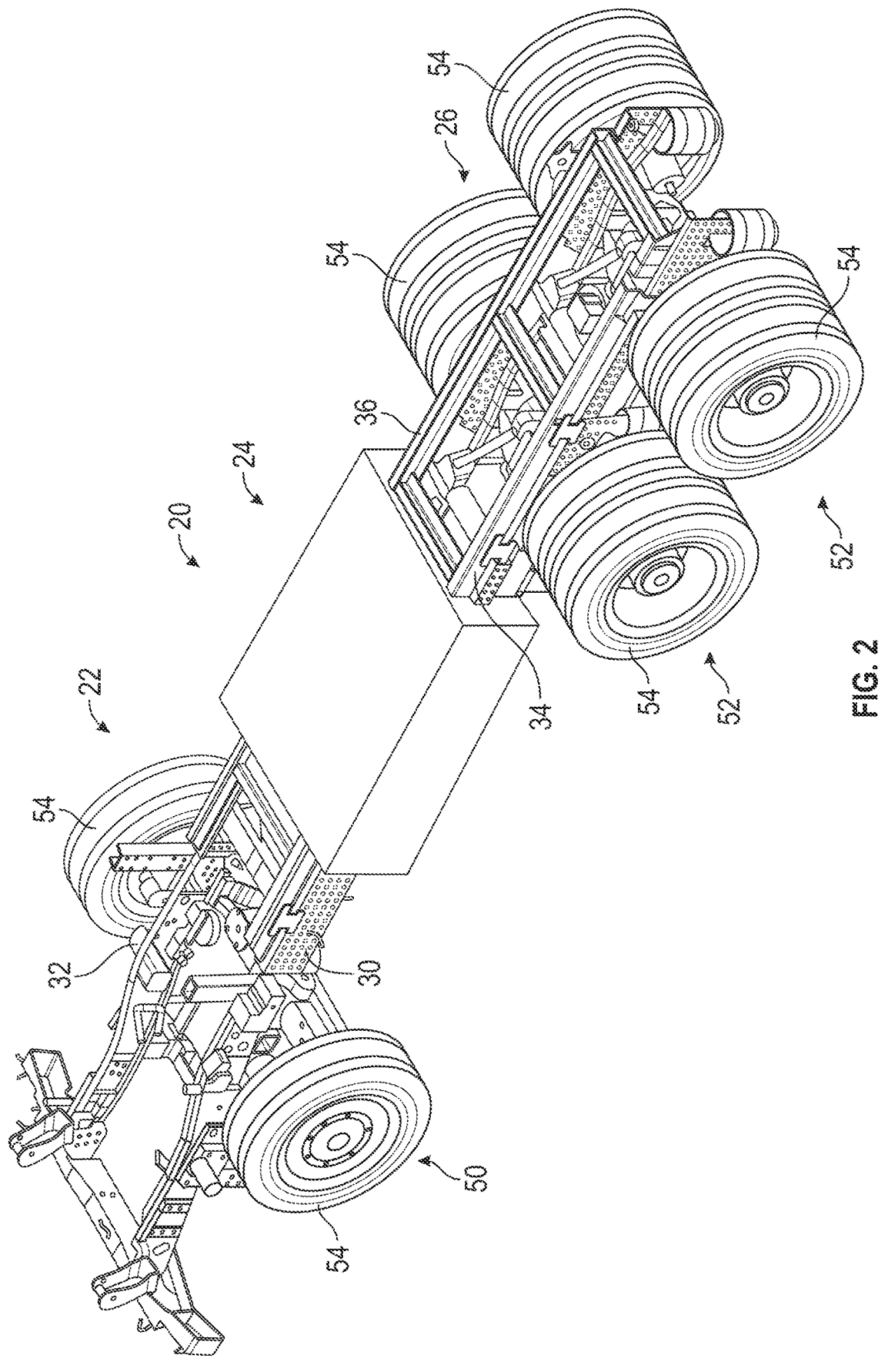
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may combust fuel (e.g., gasoline, diesel, etc.) to provide mechanical energy, which a transmission may receive and provide to the axle front axle 50 and/or the rear axles 52 to propel the vehicle 10. Additionally or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle is longitudinal, with the front side 86 being arranged forward of the rear side 88.

A. Front-Loading Refuse Vehicle

Figure 3:
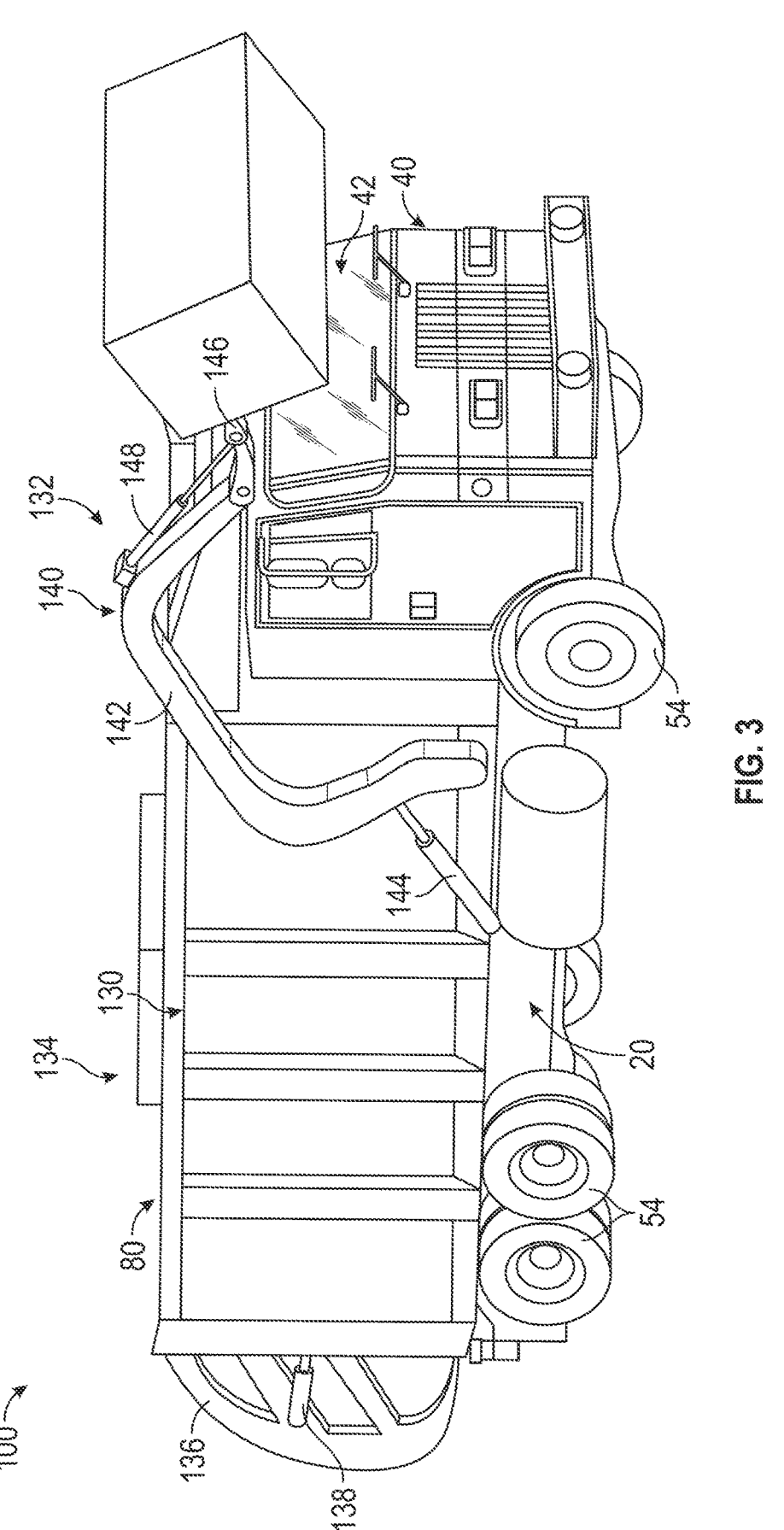
FIG. 3 is a perspective view of the vehicle of FIG. 1 configured as a front-loading refuse vehicle, according to an exemplary embodiment.
Figure 4:
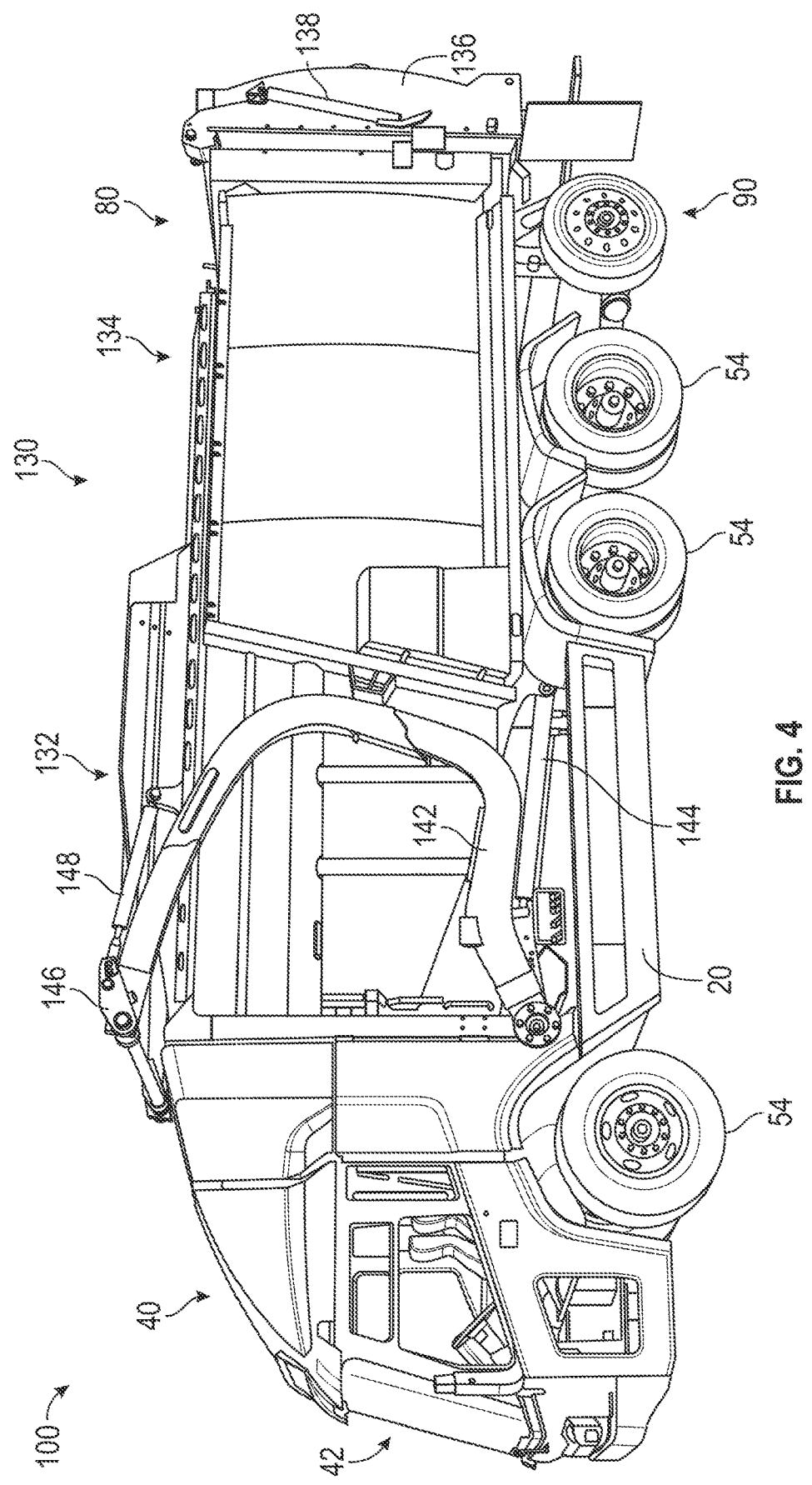
FIG. 4 is a left side view of the front-loading refuse vehicle of FIG. 3 configured with a tag axle.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively coupled the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 5:
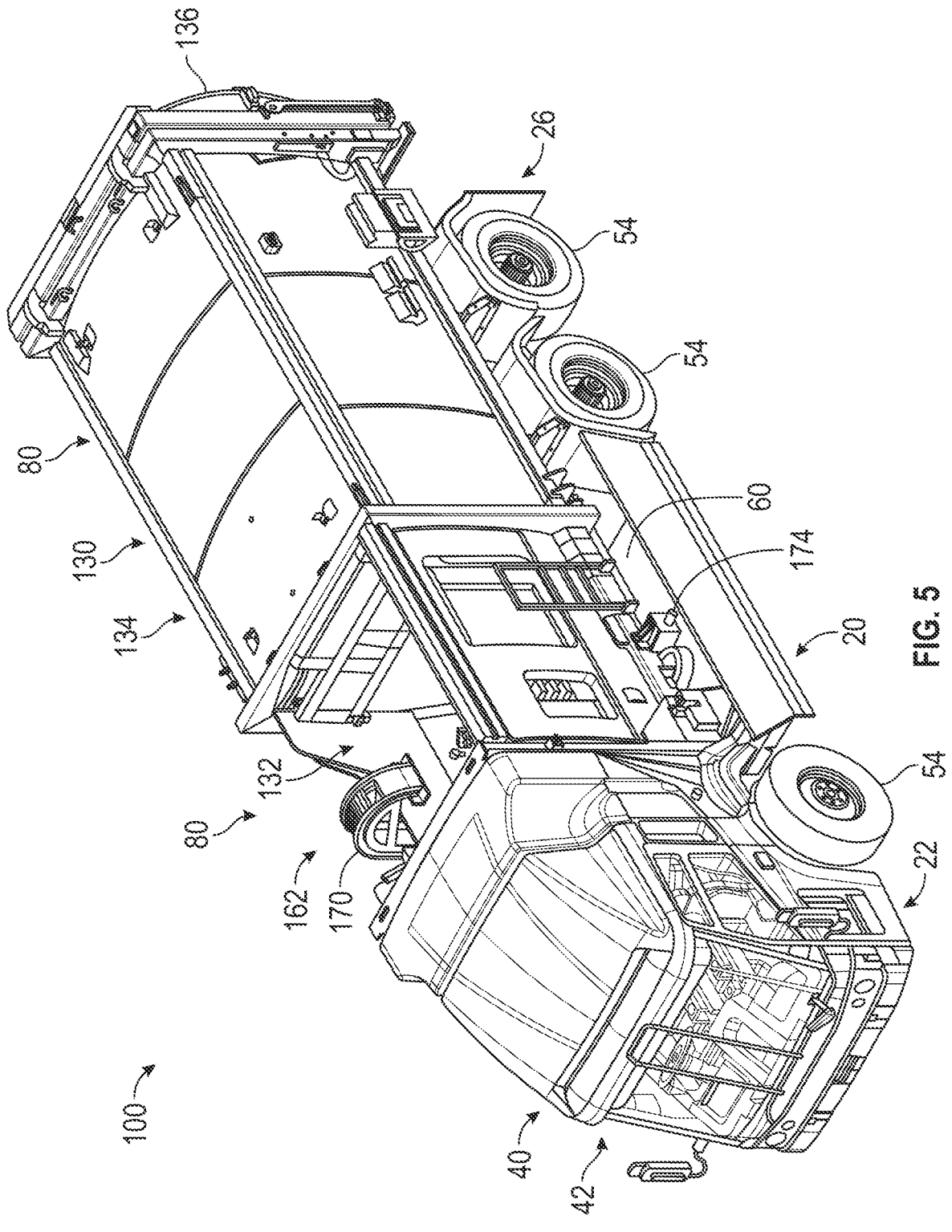
FIG. 5 is a perspective view of the vehicle of FIG. 1 configured as a side-loading refuse vehicle, according to an exemplary embodiment.
Figure 6:
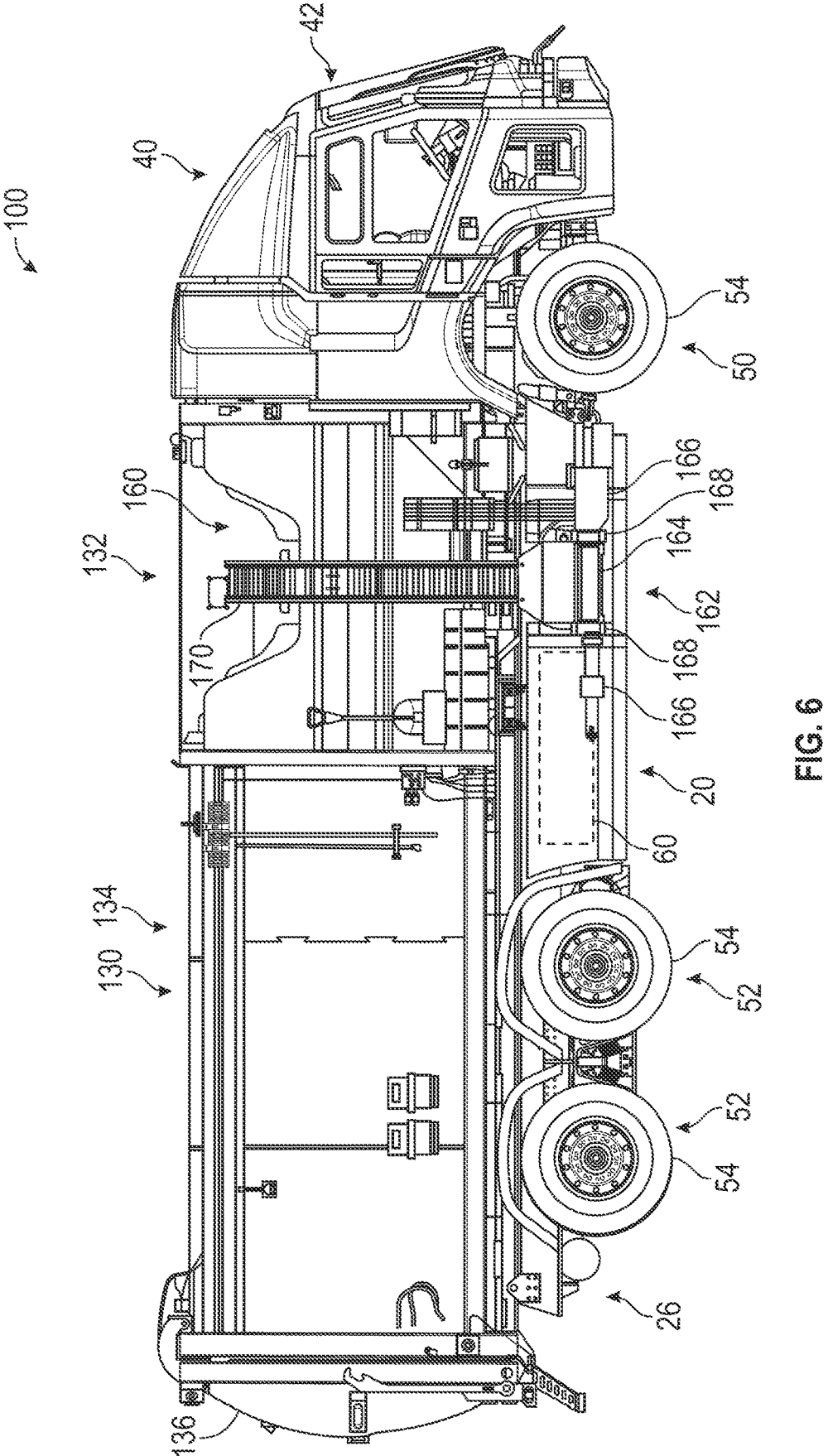
FIG. 6 is a right side view of the side-loading refuse vehicle of FIG. 5.
Figure 7:
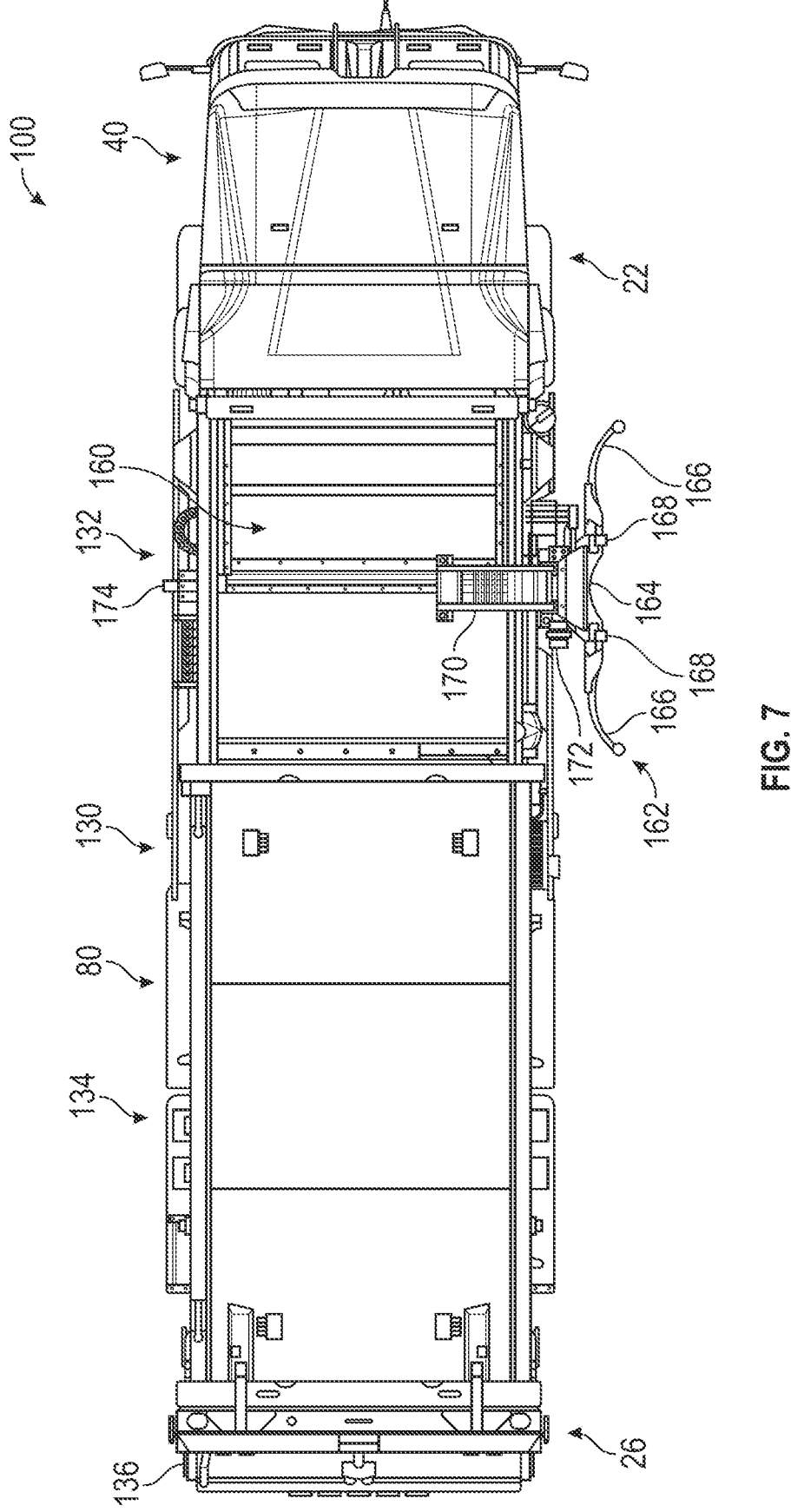
FIG. 7 is a top view of the side-loading refuse vehicle of FIG. 5.
Figure 8:
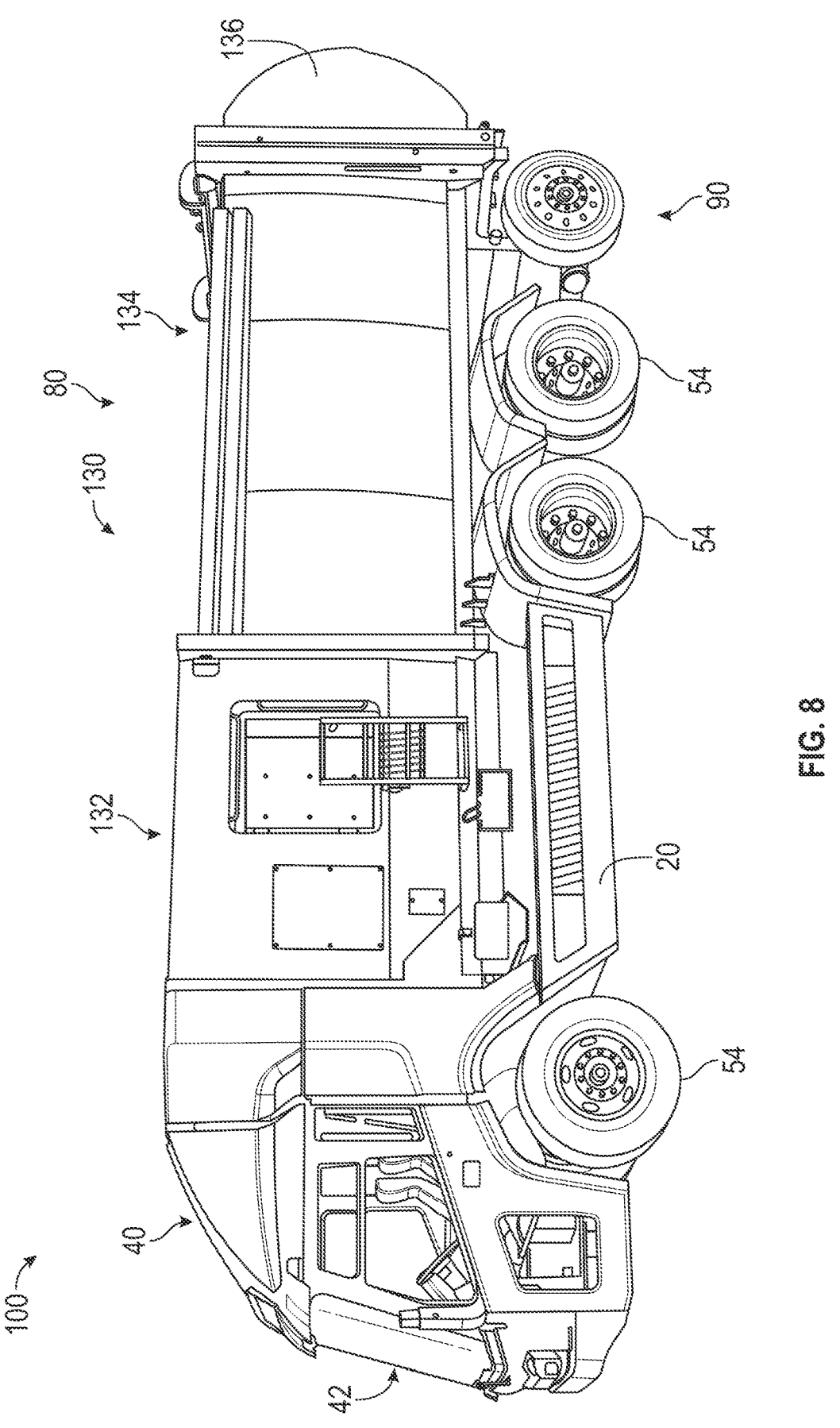
FIG. 8 is a left side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown, the refuse vehicle 100 of FIGS. 5-7 is configured with a tag axle 90 in FIG. 8.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
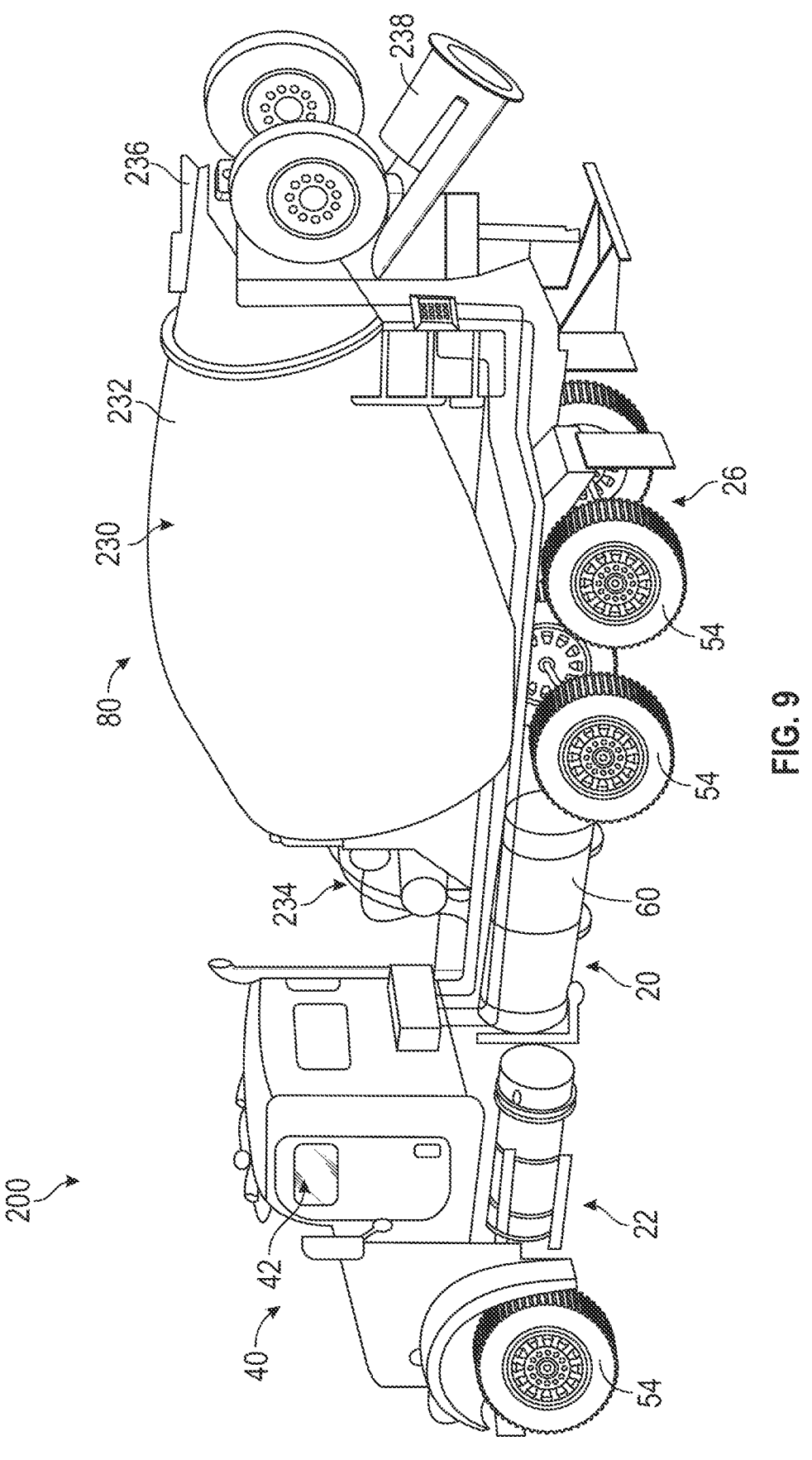
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plan extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
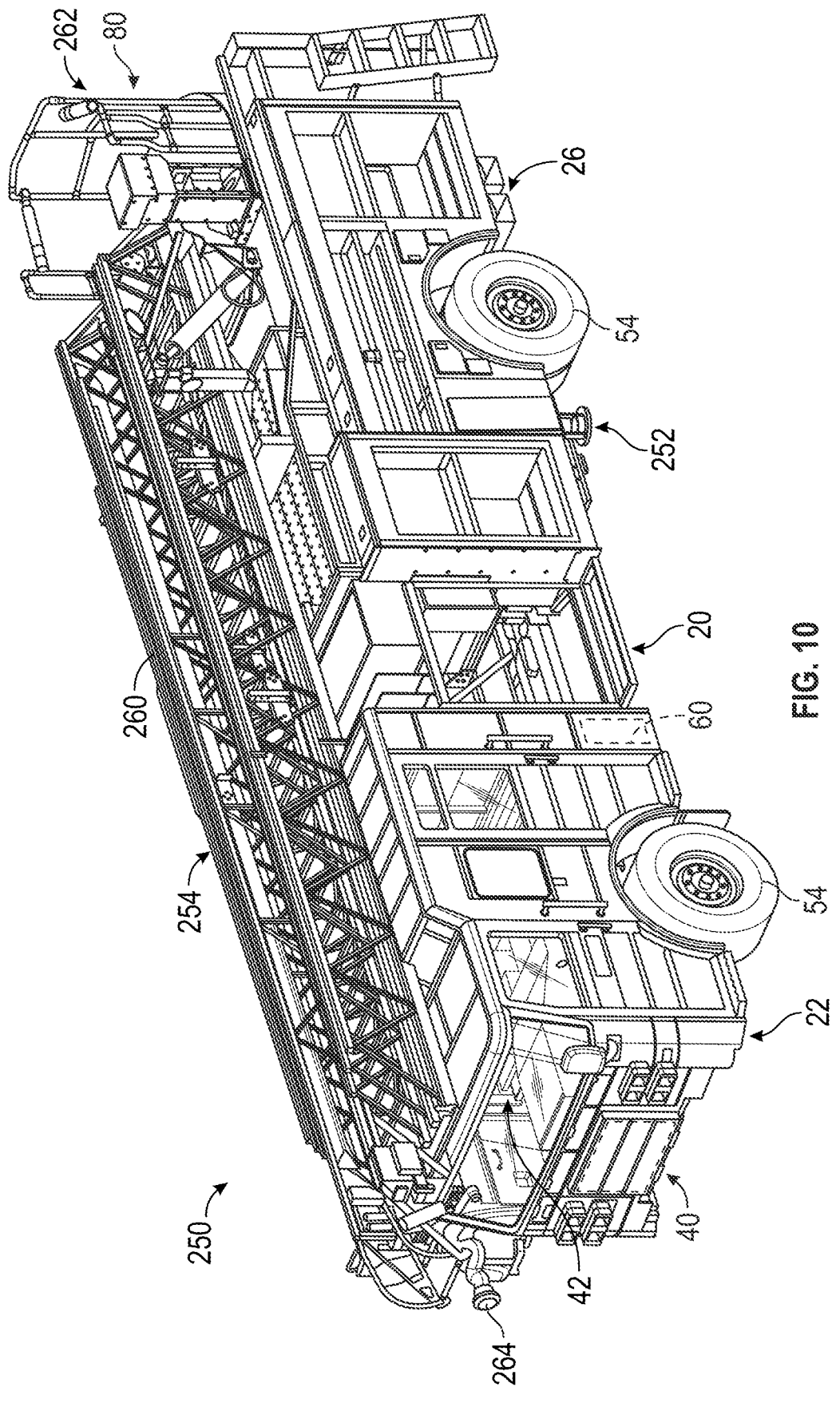
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an onboard water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) in order to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
FIG. 11 is a left side view of the vehicle of FIG. 1 configured as an airport fire fighting vehicle, according to an exemplary embodiment.

Referring now to FIG. 11, the vehicle 10 is configured as a fire fighting vehicle, shown as airport rescue and fire fighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high pressure pump and/or a low pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
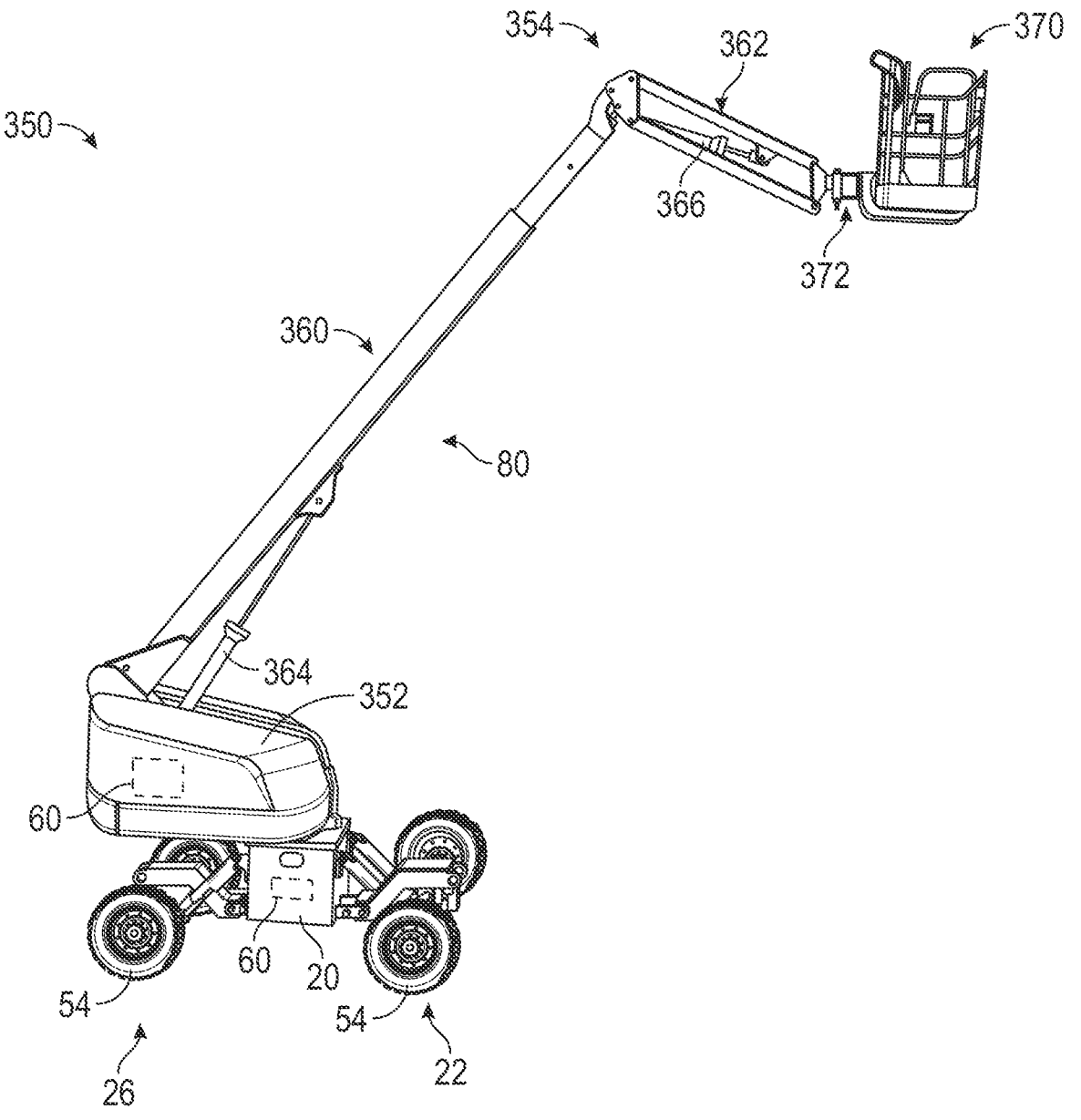
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a fork lift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may includes structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
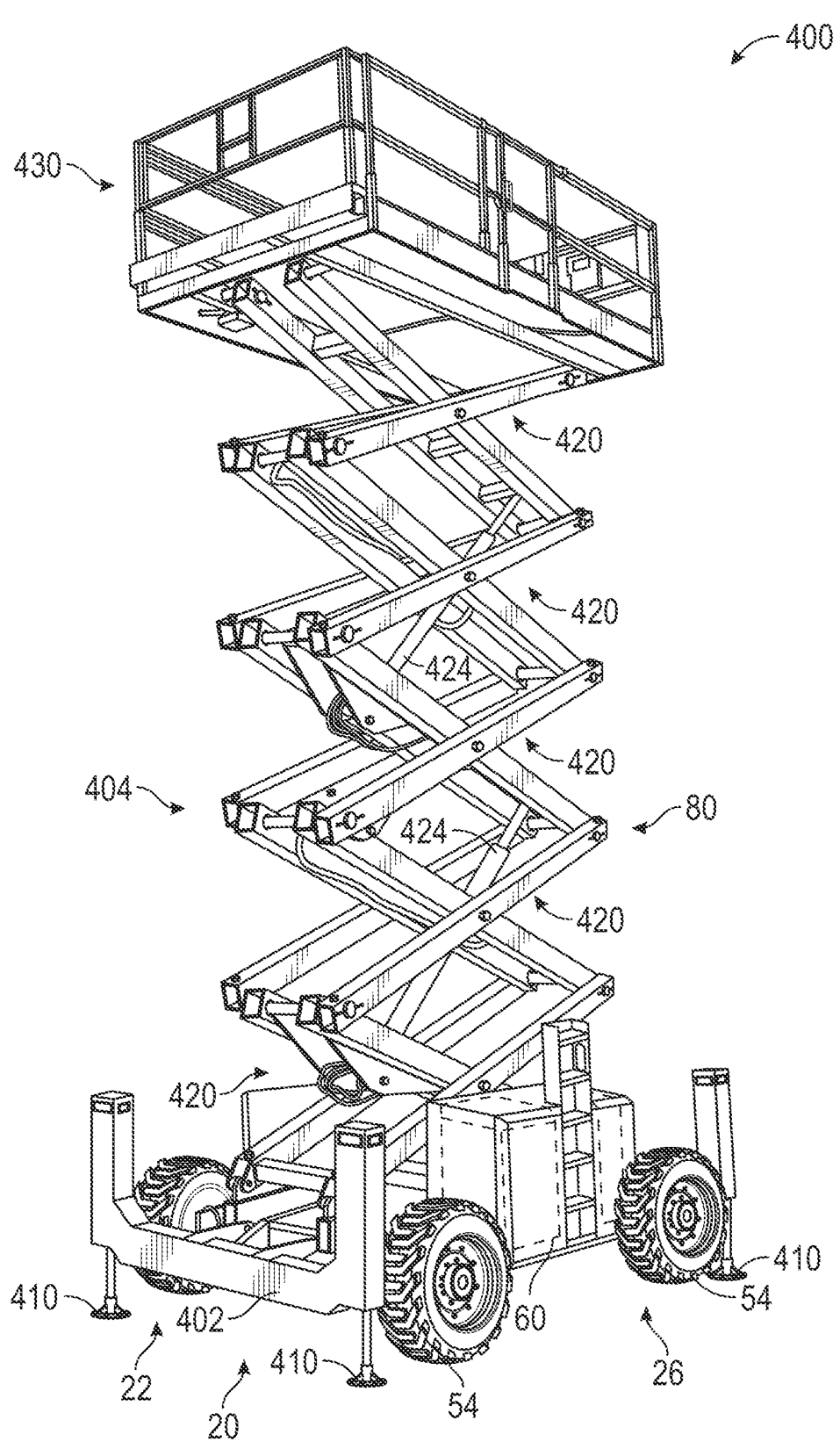
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off of the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Hydraulic Pump and Motor Systems

A. Two Motors and Two Pumps

Figure 14:
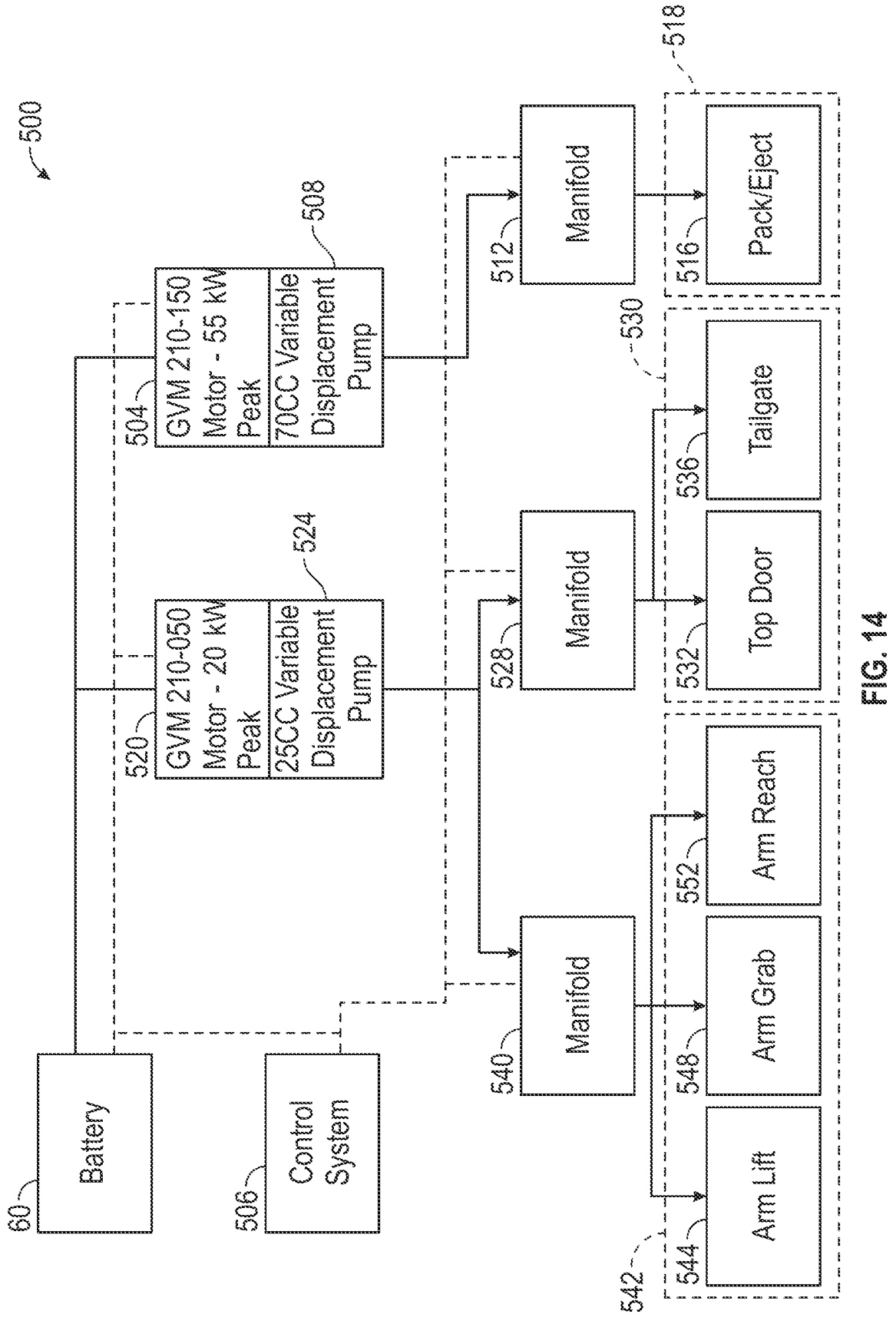
FIG. 14 is a schematic representation of two-motor, two-pump hydraulic system, according to an exemplary embodiment.

As shown in FIG. 14, the vehicle 10 in the form of the refuse vehicle 100 includes the application kit 80 including a hydraulic system 500. The hydraulic system 500 includes a first electric motor 504 receiving electrical power from the batteries 60. A control system 506 is in electrical communication with the battery 60 and with the first electric motor 504, and controls operation of the first electric motor 504.

A first hydraulic pump 508 is mechanically connected to the first electric motor 504 and provides hydraulic power to the refuse vehicle 100 in the form of pressurized hydraulic fluid. In some embodiments, the first hydraulic pump 508 is a variable displacement pump (e.g., a swashplate adjusted variable displacement pump). In some embodiments, the first hydraulic pump 508 is a swash plate type piston pump. In some embodiments, the first hydraulic pump 508 is a vane pump, or another type of variable displacement pump, as desired.

A first manifold 512 is connected in fluid communication with the first hydraulic pump 508 and includes control elements (e.g., valves, spool valves, solenoids, springs, pilots, logic valves, metering valves, priority logic, pressure reducers, etc.) to control the flow of hydraulic fluid between the first hydraulic pump 508 and a packer hydraulic actuator 516 of a packer/ejector system 518. In some embodiments, the first manifold 512 is only fluidly connected to the packer/ejector system 518 so that the first hydraulic pump does not provide hydraulic power to any other body function of the application kit 80. In other words, operation of the first electric motor 504, and therefore the first hydraulic pump 508, only provide hydraulic power to the packer/ejector assembly 518 and specifically to the packer hydraulic actuator 516.

The hydraulic system 500 includes a second electric motor 520 receiving electrical power from the batteries 60. The control system 506 is in electrical communication with the battery 60 and with the second electric motor 520, and controls operation of the second electric motor 520. In some embodiments, the second electric motor 520 is rated to provide a peak power of twenty kilowatts (20 kW). In some embodiments, the second electric motor 520 may have a different peak power rating or may be provided by a different supplier, as desired.

A second hydraulic pump 524 is mechanically connected to the second electric motor 520 and provides hydraulic power to the refuse vehicle 100 in the form of pressurized hydraulic fluid. In some embodiments, the second hydraulic pump 524 is a variable displacement pump (e.g., a swash-plate adjusted variable displacement pump). In some embodiments, the second hydraulic pump 524 is a twentyeight cubic centimeter (28 cc) pump. In some embodiments, the second hydraulic pump 524 is a twenty-five cubic centimeter (25 cc) pump. In some embodiments, the second hydraulic pump 524 defines a different displacement, as desired. In some embodiments, the second hydraulic pump 524 is a swash plate type piston pump. In some embodiments, the second hydraulic pump 524 is a vane pump, or another type of variable displacement pump, as desired.

A second manifold 528 is connected in fluid communication with the second hydraulic pump 524 and includes control elements (e.g., valves, spool valves, solenoids, springs, pilots, logic valves, metering valves, priority logic, pressure reducers, etc.) to control the flow of hydraulic fluid between the second hydraulic pump 524 and a door assembly 530 including a top door actuator 532 and a tailgate actuator 536.

A third manifold 540 is connected in fluid communication with the second hydraulic pump 524 and includes control elements (e.g., valves, spool valves, solenoids, springs, pilots, logic valves, metering valves, priority logic, pressure reducers, etc.) to control the flow of hydraulic fluid between the second hydraulic pump 524 and an arm assembly 542 including an arm lift actuator 544, an arm grab actuator 548, and an arm reach actuator 552.

B. Three Motors and Three Pumps

Figure 15:
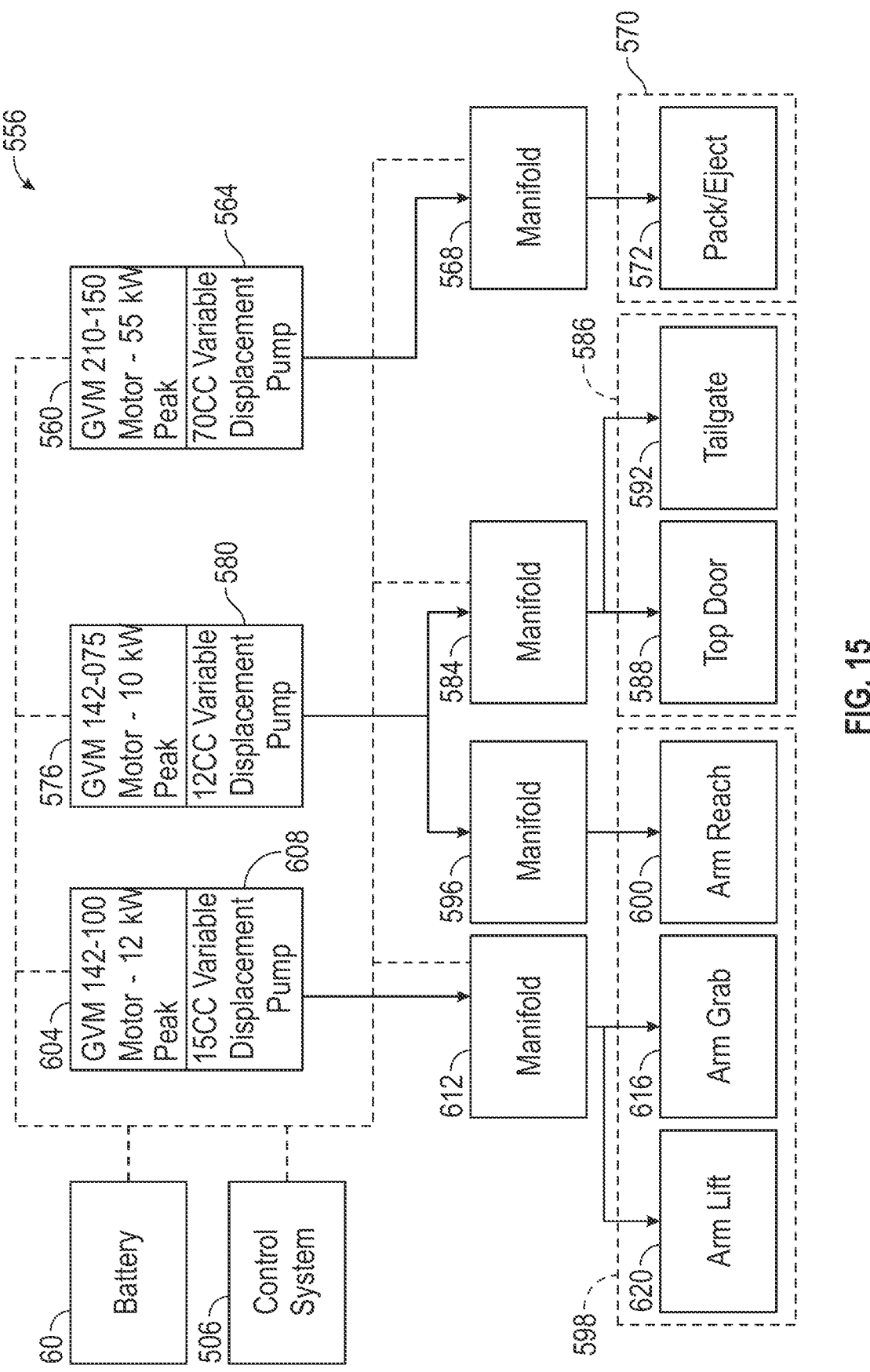
FIG. 15 is a schematic representation of three-motor, three-pump hydraulic system, according to an exemplary embodiment.

As shown in FIG. 15, the vehicle 10 in the form of the refuse vehicle 100 includes the application kit 80 including a hydraulic system 556 similar to the hydraulic system 500 discussed above. The hydraulic system 556 includes a first electric motor 560 receiving electrical power from the batteries 60. The control system 506 is in electrical communication with the battery 60 and with the first electric motor 556, and controls operation of the first electric motor 556. In some embodiments, the first electric motor 556 is rated to provide a peak power of fifty-five kilowatts (55 kW). In some embodiments, the first electric motor 556 may have a different peak power rating or may be provided by a different supplier, as desired.

A first hydraulic pump 564 is mechanically connected to the first electric motor 560 and provides hydraulic power to the refuse vehicle 100 in the form of pressurized hydraulic fluid. In some embodiments, the first hydraulic pump 564 is a variable displacement pump (e.g., a swashplate adjusted variable displacement pump). In some embodiments, the first hydraulic pump 564 is an eighty cubic centimeter (80 cc) pump. In some embodiments, the first hydraulic pump 564 is a seventy cubic centimeter (70 cc) pump. In some embodiments, the first hydraulic pump 564 defines a different displacement, as desired. In some embodiments, the first hydraulic pump 564 is a swash plate type piston pump. In some embodiments, the first hydraulic pump 564 is a vane pump, or another type of variable displacement pump, as desired.

A first manifold 568 is connected in fluid communication with the first hydraulic pump 564 and includes control elements (e.g., valves, spool valves, solenoids, springs, pilots, logic valves, metering valves, priority logic, pressure reducers, etc.) to control the flow of hydraulic fluid between the first hydraulic pump 564 and a packer hydraulic actuator 572 of a packer/ejector system 570. In some embodiments, the first manifold 568 is only fluidly connected to the packer/ejector system 570 so that the first hydraulic pump 560 does not provide hydraulic power to any other body function of the application kit 80. In other words, operation of the first electric motor 560, and therefore the first hydraulic pump 564, only provide hydraulic power to the packer/ejector assembly 570 and specifically to the packer hydraulic actuator 572.

The hydraulic system 556 includes a second electric motor 576 receiving electrical power from the batteries 60. The control system 506 is in electrical communication with the battery 60 and with the second electric motor 576, and controls operation of the second electric motor 576. In some embodiments, the second electric motor 576 is rated to provide a peak power of ten kilowatts (10 kW). In some embodiments, the second electric motor 576 may have a different peak power rating or may be provided by a different supplier, as desired.

A second hydraulic pump 580 is mechanically connected to the second electric motor 576 and provides hydraulic power to the refuse vehicle 100 in the form of pressurized hydraulic fluid. In some embodiments, the second hydraulic pump 580 is a variable displacement pump (e.g., a swashplate adjusted variable displacement pump). In some embodiments, the second hydraulic pump 580 is a twelve cubic centimeter (12 cc) pump. In some embodiments, the second hydraulic pump 580 defines a different displacement, as desired. In some embodiments, the second hydraulic pump 580 is a swash plate type piston pump. In some embodiments, the second hydraulic pump 580 is a vane pump, or another type of variable displacement pump, as desired.

A second manifold 584 is connected in fluid communication with the second hydraulic pump 580 and includes control elements (e.g., valves, spool valves, solenoids, springs, pilots, logic valves, metering valves, priority logic, pressure reducers, etc.) to control the flow of hydraulic fluid between the second hydraulic pump 580 and a door assembly 586 including a top door actuator 588 and a tailgate actuator 592.

A third manifold 596 is connected in fluid communication with the second hydraulic pump 580 and includes control elements (e.g., valves, spool valves, solenoids, springs, pilots, logic valves, metering valves, priority logic, pressure reducers, etc.) to control the flow of hydraulic fluid between the second hydraulic pump 580 and an arm assembly 598 including an arm reach actuator 600.

The hydraulic system 556 includes a third electric motor 604 receiving electrical power from the batteries 60. The control system 506 is in electrical communication with the battery 60 and with the third electric motor 604, and controls operation of the third electric motor 604. In some embodiments, the third electric motor 604 is rated to provide a peak power of twelve kilowatts (12 kW). In some embodiments, the third electric motor 604 may have a different peak power rating or may be provided by a different supplier, as desired.

A third hydraulic pump 608 is mechanically connected to the third electric motor 604 and provides hydraulic power to the refuse vehicle 100 in the form of pressurized hydraulic fluid. In some embodiments, the third hydraulic pump 608 is a variable displacement pump (e.g., a swashplate adjusted variable displacement pump). In some embodiments, the third hydraulic pump 608 is a fifteen cubic centimeter (15 cc) pump. In some embodiments, the third hydraulic pump 608 defines a different displacement, as desired. In some embodiments, the third hydraulic pump 608 is a swash plate type piston pump. In some embodiments, the third hydraulic pump 608 is a vane pump, or another type of variable displacement pump, as desired.

A fourth manifold 612 is connected in fluid communication with the third hydraulic pump 608 and includes control elements (e.g., valves, spool valves, solenoids, springs, pilots, logic valves, metering valves, priority logic, pressure reducers, etc.) to control the flow of hydraulic fluid between the third hydraulic pump 608 and the arm assembly 598 and specifically an arm grab actuator 616 and an arm lift actuator 620.

In addition to the two-motor and two-pump hydraulic system 500 and the three-motor and three-pump hydraulic system 556 described above, a two-pump and one-motor hydraulic system or a one-motor and two-pump with a gear box hydraulic system are contemplated. While specific components and actuators are discussed above with respect to the second manifolds 528 and 584, the third manifolds, 540 and 596, and the fourth manifold 612, it is contemplated that other body functions of the application kit 80 could be supplied by the manifolds. In some embodiments, the packer/ejector assemblies 518 and 570 require the largest single load, and the first manifolds 512 and 568 provide dedicated hydraulic power for the packer/ejector assemblies 518 and 568. In some embodiments, the electric motors described herein are driven by auxiliary power units (APUs) such as an onboard generator connected with the battery or in place of the battery.

The two-motor and two-pump hydraulic system 500 provides a balance between system cost and energy efficiency. More motors provides better efficiency (e.g., three motors is more efficient than two motors) because hydraulic power is produced only for body functions that are in use (e.g., if the lift arm is not being used, no hydraulic pressure needs to be provided to the lift assembly and the associated electric motor and pump can be deactivated). In some embodiments, the system 500 beneficially de-couples hydraulic functions that are typically driven off a common hydraulic pump, therefore removing pressure compensation that would be required otherwise. More motors are more costly than less motors. Utilizing a gearbox and a clutch to selectively couple multiple pumps to a single motor can provide improved system efficiency when compared with a single pump with no gear box, but adds system complexity and weight. The gearbox also adds to maintenance needs. Improvement of energy efficiency of the motor and pump arrangements can provide meaningful improvements to overall vehicle operation. For example, the two-motor and two-pump hydraulic system 500 may provide an estimated 12.8 percent range extension for the refuse vehicle 100. The three-motor and three-pump hydraulic system 556 may provide an estimated 15.2 percent range extension for the refuse vehicle 100.

C. Structural Arrangement

Figure 16:
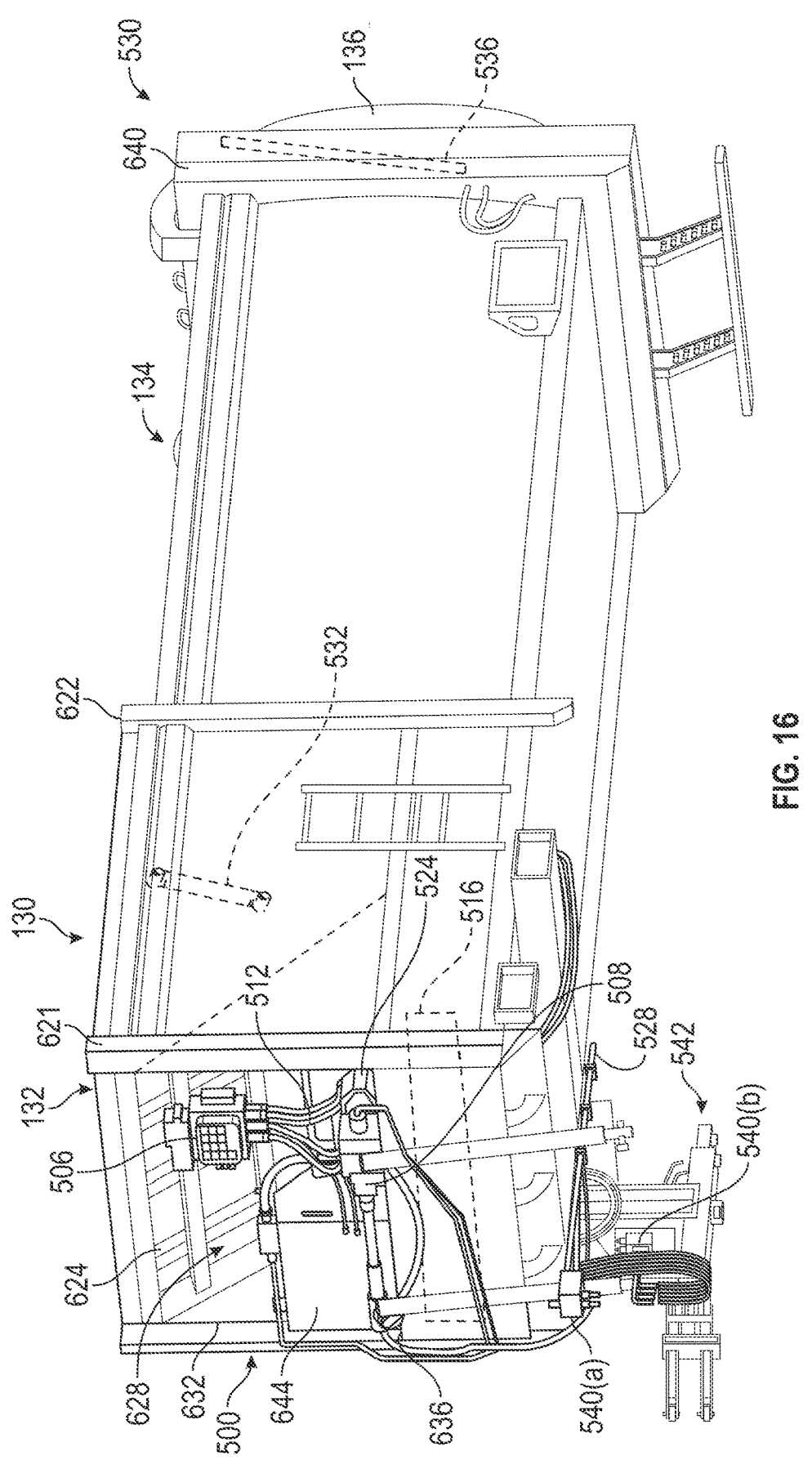
FIG. 16 is a perspective view of a storage compartment of a refuse vehicle, according to an exemplary embodiment.
Figure 17:
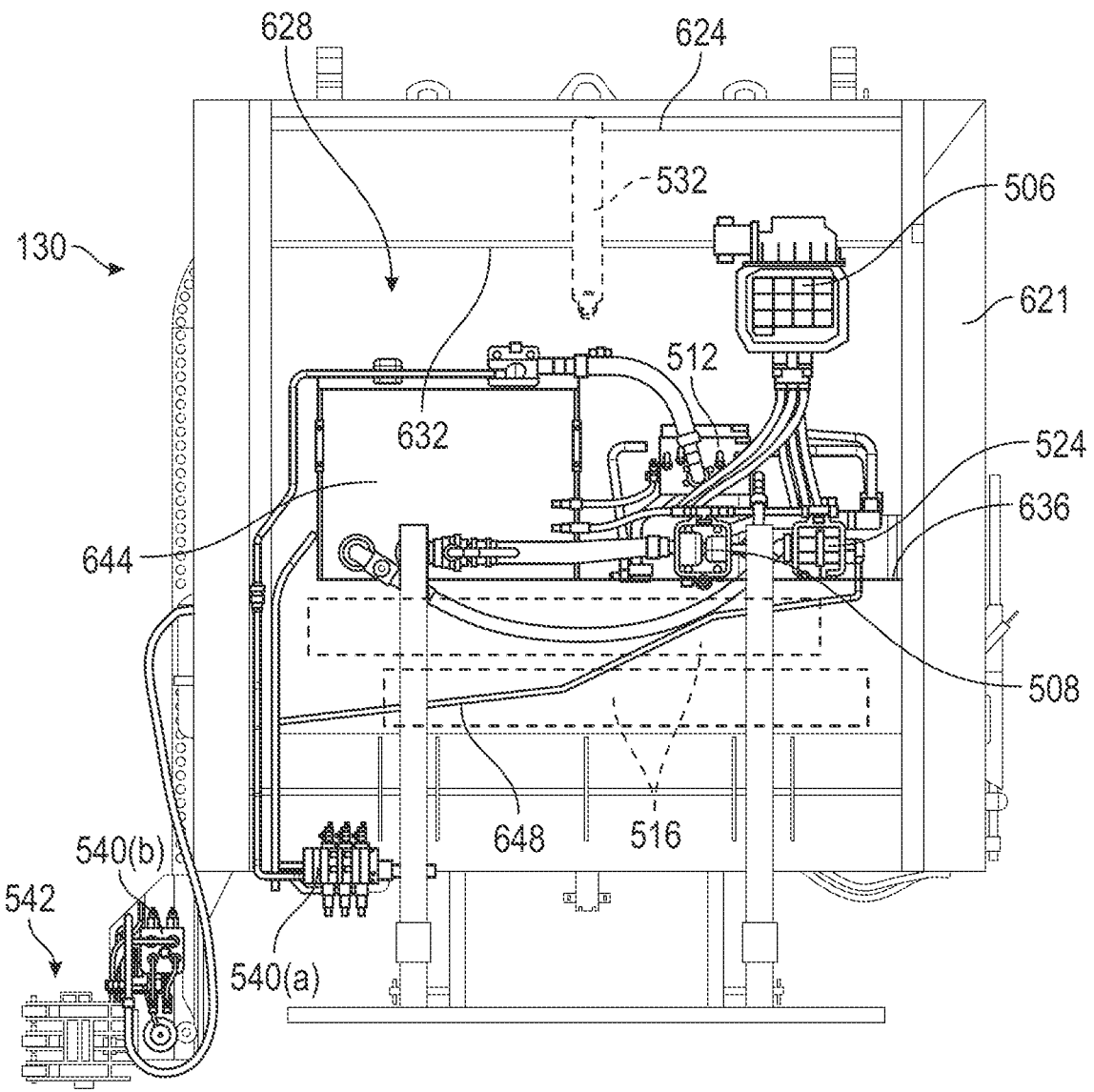
FIG. 17 is a front view of the storage compartment of FIG. 16, according to an exemplary embodiment.

As shown in FIGS. 16 and 17, the refuse compartment 130 includes the hopper volume 132 and the storage volume 134. The hopper volume 132 is defined between a front post in the form of an A-pillar 621 and a mid-post in the form of a B-pillar 622 and includes a front wall 624 positioned adjacent (e.g., behind) the cab 40 and defines a hydraulic system cavity 628. In some embodiments, the hydraulic system cavity 628 includes a sloped or slanted upper wall portion 632 and a headframe or shelf 636. The sloped upper wall portion 632 and the shelf 636 protrude into the hopper volume 132. The shelf 636 is built structurally to support the hydraulic system 500 including reservoir, pumps, motors, inverter, and packer manifold.

The storage volume 134 is defined between the B-pillar 622 and a rear post in the form of a C-pillar 640. The tailgate 136 is coupled to the C-pillar 640 to provide selective access to the storage volume 134.

The hydraulic system 500 is positioned on the refuse compartment to minimize the number of connections (e.g., elbows, reductions, couplings, etc.) and the length of hydraulic hosing runs. Specifically, the shelf 636 supports the first electric motor 504 and first hydraulic pump 508, the second electric motor 520 and the second hydraulic pump 524, and a hydraulic fluid reservoir 644. The first hydraulic pump 508 and the second hydraulic pump 524 are positioned adjacent the hydraulic fluid reservoir 644 to reduce the length of hosing runs therebetween. The control system 506 is also housed in the hydraulic system cavity 628.

The first manifold 512 is also positioned within the hydraulic system cavity 628 of the refuse compartment and arranged to receive hydraulic fluid from the first hydraulic pump 508 and to selectively provide pressurized hydraulic fluid to the packer hydraulic actuator 516. The position of the first manifold 512 within the hydraulic system cavity 628 minimizes the length of tubing and connections needed to connect between the first hydraulic pump 508 and the packer hydraulic actuator 516 which is position within the hopper volume 132. The components of the hydraulic system 500 mounted within the hydraulic system cavity 628 can be mounted using mounting slots to allow for tolerance stack-up for components with steel tubes.

The third manifold 540 is positioned remote of the hydraulic system cavity 628 and adjacent the lift assembly 160. The refuse vehicle 100 illustrated in FIGS. 16 and 17 is a side-loading refuse vehicle 100 with a grabber arm, the third manifold 540 is positioned adjacent to the lift assembly regardless of the type of vehicle. For example, a front-loading refuse vehicle 100 may include a third manifold 540 positioned adjacent a lifting assembly 140. As shown in FIG. 16, the second hydraulic pump 524 provides hydraulic fluid to the third manifold 540 via a lift manifold trunk line 648. Positioning the third manifold 540 remote from the hydraulic system cavity 628 and remote from the second hydraulic pump 524 allows for a single large flow capacity lift manifold trunk line 648 with a minimum number of bends, connections, and flow restrictions thereby improving overall efficiency of the hydraulic operation of the lift assembly 160. The location of the third manifold 540 adjacent the lift assembly 160 also minimizes the length of hydraulic hoses and the number of connections required between the third manifold 540 and the lift assembly 160. In some embodiments, the third manifold 540 is positioned on the front wall 628 of the refuse compartment 130. In some embodiments, the third manifold 540 is positioned on a side wall of the refuse compartment 130. In some embodiments, the third manifold 540 includes more than one housing. For example, a primary third manifold 540(a) is located on the front wall 628 and a secondary third manifold 540(b) is positioned on the lift assembly 160. Both the primary third manifold 540(a) and the secondary third manifold 540(b) are positioned remote from the hydraulic system cavity 628 and the second hydraulic pump 524, and adjacent the lift assembly 160.

Figures 18, 19:
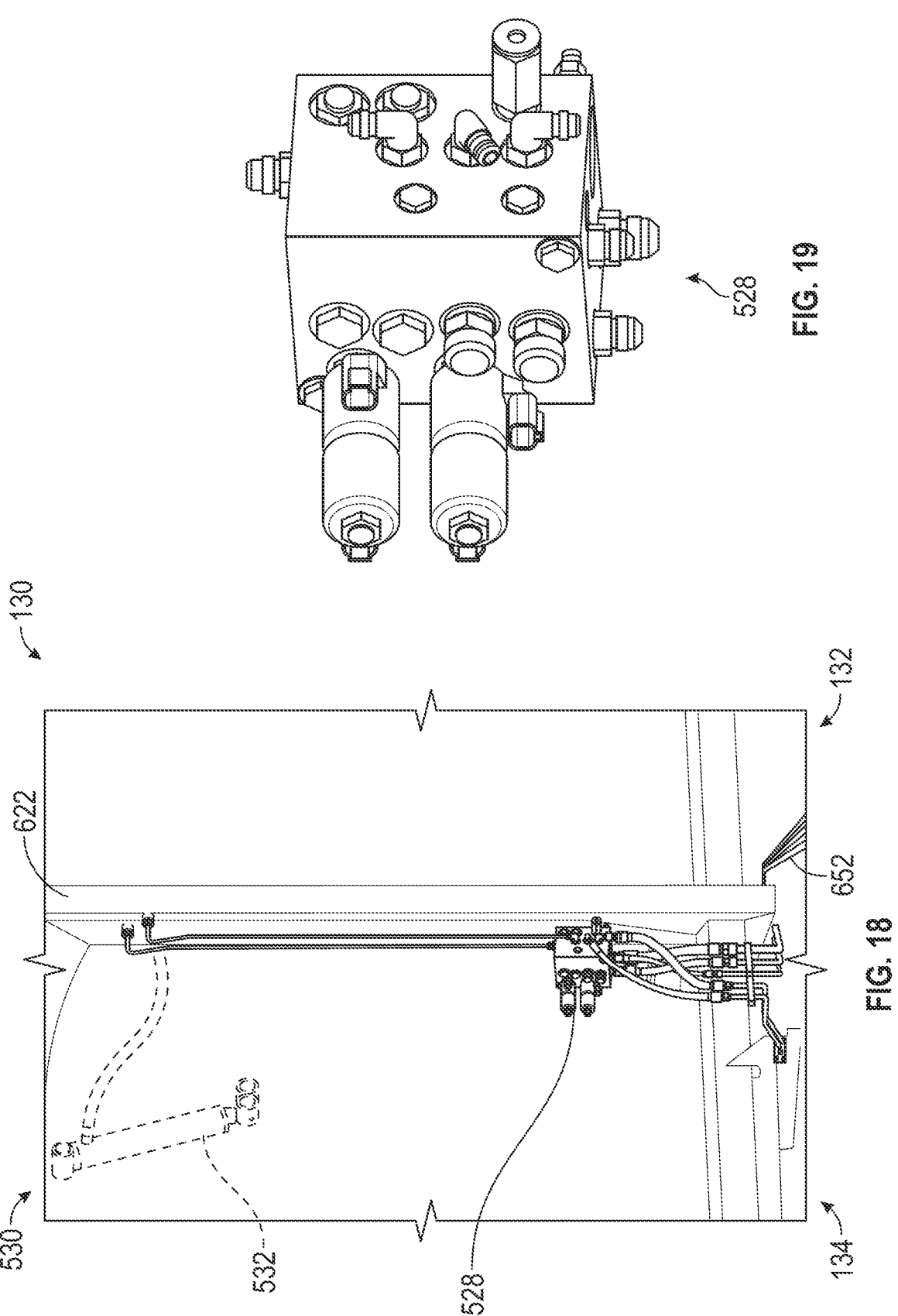
FIG. 18 is a perspective view of the storage compartment of FIG. 16, according to an exemplary embodiment.
FIG. 19 is a perspective view of a lift manifold of the storage compartment of FIG. 18, according to an exemplary embodiment.

As shown in FIGS. 18 and 19, the second manifold 528 positioned remote from the hydraulic system cavity 628 and the second hydraulic pump 524, and adjacent to or rearward of the B-pillar 622. Positioning the second manifold 528 remote from the hydraulic system cavity 628 and remote from the second hydraulic pump 524 allows for a single large flow capacity lift manifold trunk line 652 with a minimum number of bends, connections, and flow restrictions thereby improving overall efficiency of the hydraulic operation of the door assembly 530. The second manifold 528 is positioned to minimize distances for hosing runs between the second manifold 528 and the top door actuator 532, and the distances for hosing runs between the second manifold 528 and the tailgate actuator 536. In some embodiments, the position of the second manifold 528 is selected to minimize the total hose distance between the second manifold 528 and the top door actuator 532 and the tailgate actuator 536. In some embodiments, a weighted average may be used in selection of the position of the second manifold 528. For example, a flow demand of the tailgate actuator 536 may be given a higher priority, or may have higher flow demands than the top door actuator 532 and therefore the second manifold 528 is positioned closer to the tailgate actuator to reduce flow losses therebetween.

D. Hydraulic System Control

Figure 20:
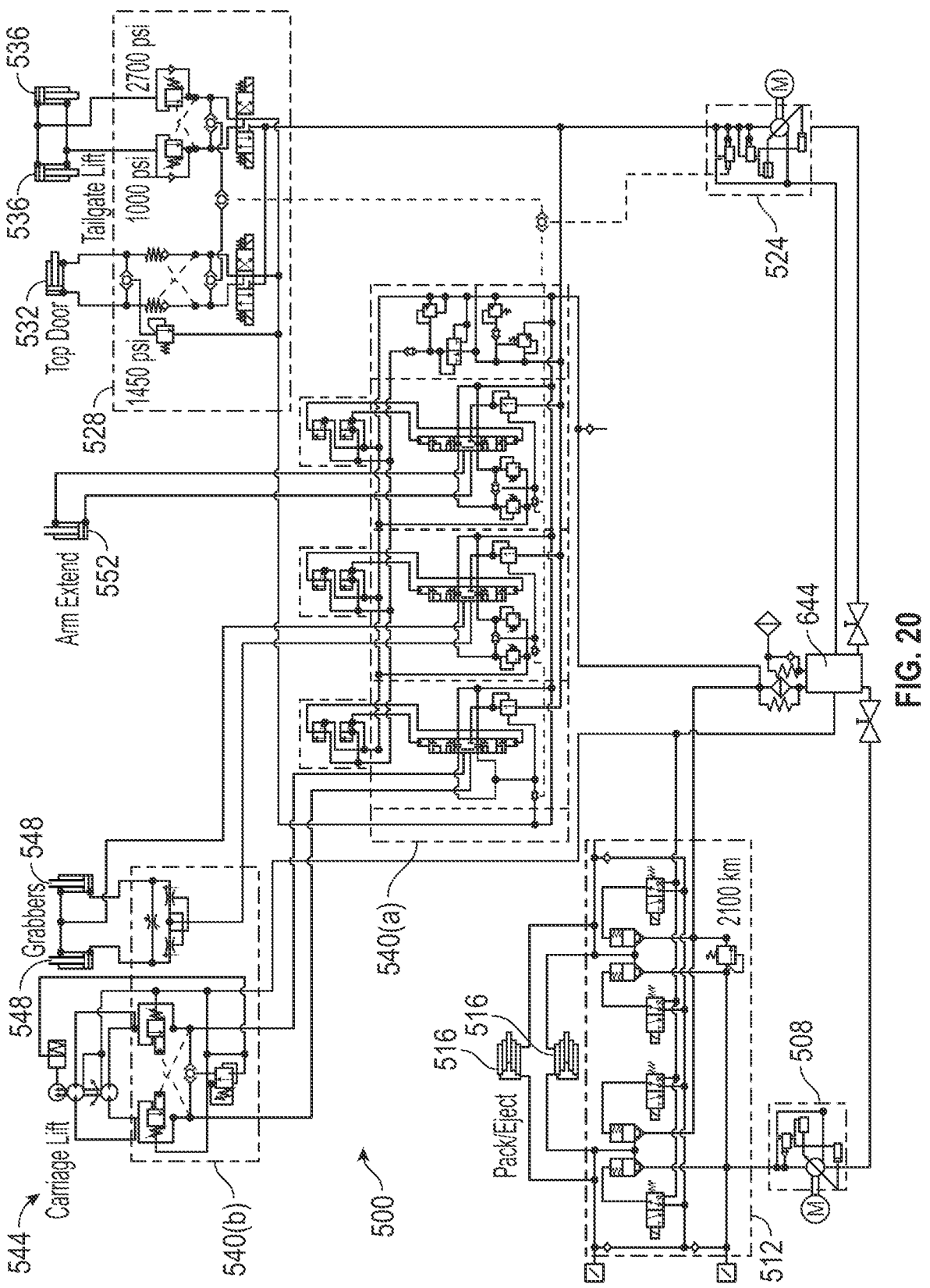
FIG. 20 is a schematic representation of the two-motor, two-pump hydraulic system of FIG. 14, according to an exemplary embodiment.

As shown in FIG. 20, the hydraulic system 500 includes the first pump 508 providing hydraulic power to the first manifold 512 and therethrough selectively operating the packer/ejector actuator 516. In some embodiments, the packer/ejector actuator 516 includes two hydraulic cylinders. The hydraulic reservoir 644 is positioned to receive return flow. The second pump 524 provides hydraulic power to the second manifold 528, the primary third manifold 540(a), and the secondary third manifold 540(b). The second manifold 528 selectively provide hydraulic power to the top door actuator 532 and the tailgate actuators 536. The primary third manifold 540(a) and the secondary third manifold 540(b) selectively provide hydraulic power to the arm lift actuator 544, the arm grab actuator 548, and the arm reach actuator 552.

Figure 21:
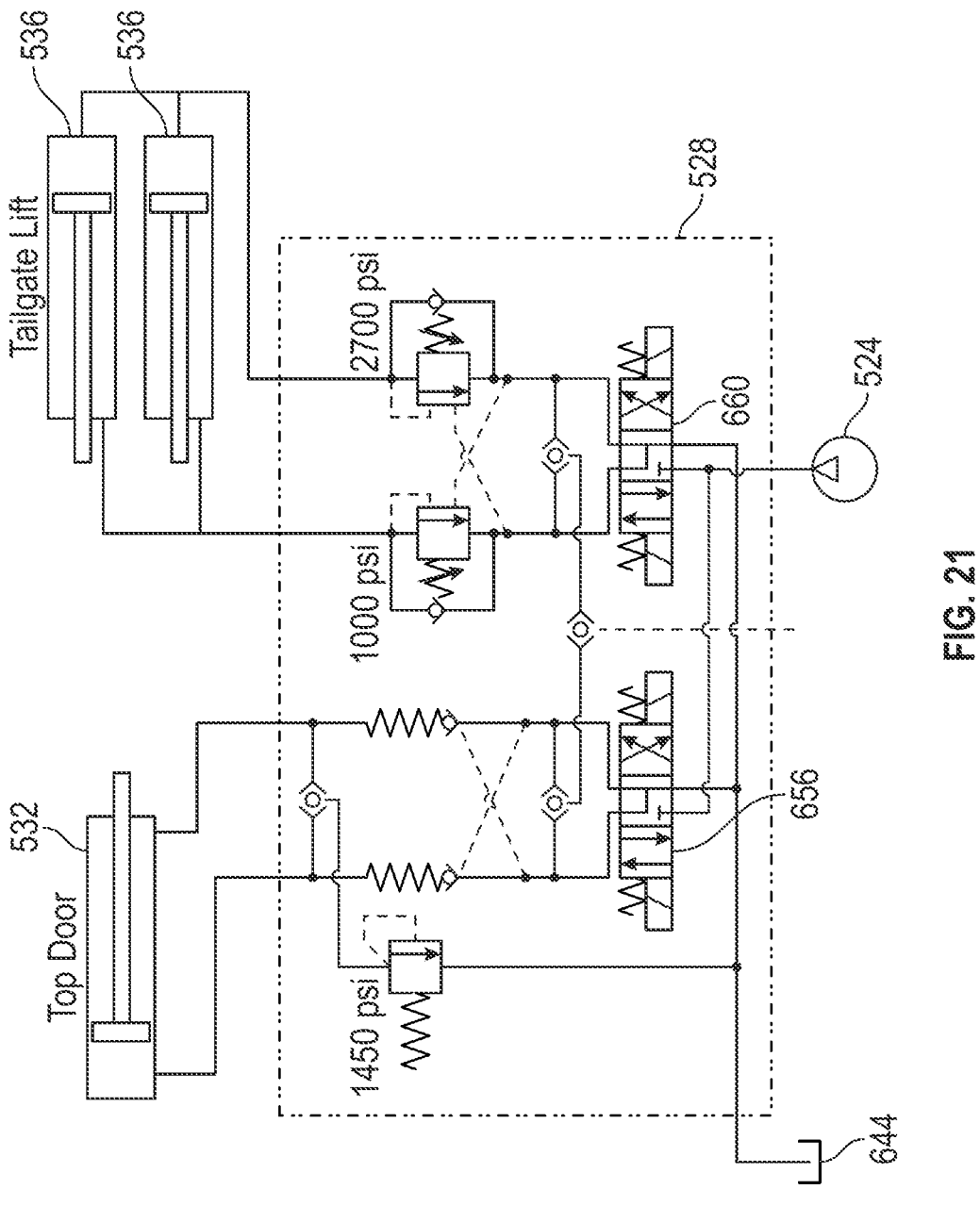
FIG. 21 is a schematic representation of a door system of the two-motor, two-pump hydraulic system of FIG. 14, according to an exemplary embodiment.

As shown in FIG. 21, the second manifold 528 includes a top door control element in the form of a top door spool valve 656. The top door spool valve 656 is a three position, four way valve that is spring centered, and dual solenoid actuated. The top door spool valve 656 defines an extend position (leftmost in FIG. 21) for extending the top door actuator 532, a lock position (middle in FIG. 21) that locks the top door actuator 532 in a current position, and a retract position (rightmost in FIG. 21) for retracting the top door actuator 532. A tailgate control element in the form of a tailgate spool valve 660 is a three position, four way valve that is spring centered, and dual solenoid actuated. The tailgate spool valve 660 defines a retract position (leftmost in FIG. 21) for retracting the tailgate spool valve 660, a lock position (middle in FIG. 21) that locks the tailgate spool valve 660 in a current position, and an extend position (rightmost in FIG. 21) for extending the tailgate spool valve 660. The second manifold 528 does not include pressure compensation (e.g., the second manifold 528 is not used simultaneously with other hydraulic body functions). The top door spool valve 656 and the tailgate spool valve 660 utilize on/off solenoid valves in place of proportional valves that are used in typical control valves.

Figure 22A:
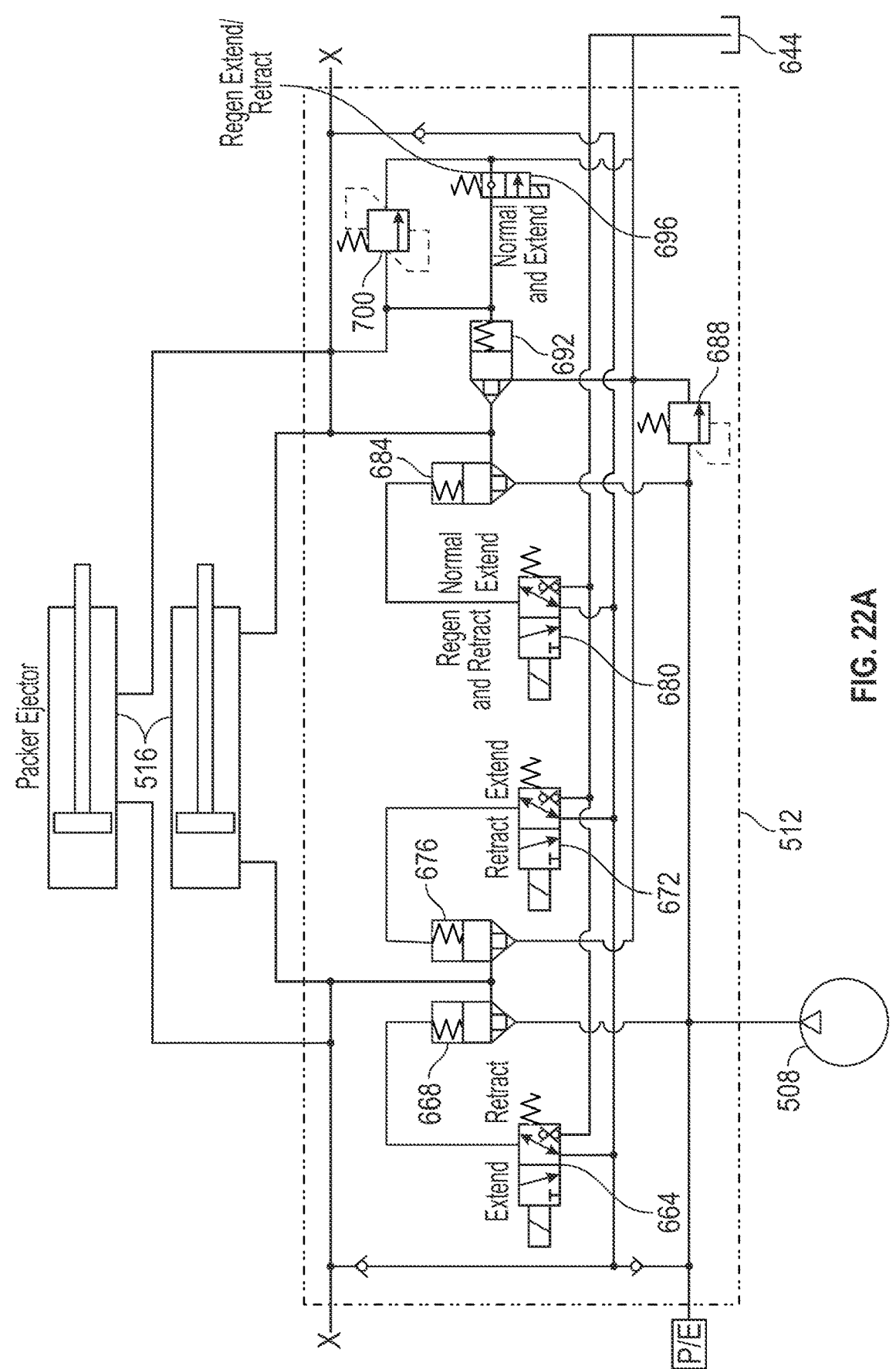
FIG. 22A is a schematic representation of a packer and ejector system of the two-motor, two-pump hydraulic system of FIG. 14, according to an exemplary embodiment.

As shown in FIG. 22A, the first manifold 512 includes a first control element in the form of a bore side extend spool 664 and a bore side extend logic valve 668; a second control element in the form of a bore side retract spool 672 and a bore side retract logic valve 676; a third control element in the form of a rod side retract spool 680 and a rod side retract logic valve 684; a fourth control element in the form of a pump side pressure relief valve 688; a fifth control element in the form of a rod side pressure relief logic valve 692 and a normal/regen spool valve 696; and a sixth control element in the form of a rod side pressure relief valve 700. The first manifold 512 defines a regeneration mode of operation and a non-regeneration mode of operation. Within this application, non-regeneration mode is referred to as a normal mode. However, in some embodiments, the regeneration mode may be used more often than the non-regeneration mode, the non-regeneration mode may be used more often than the regeneration mode, or the non-regeneration and regeneration modes may be used equally. The use of the term "normal" is not intended to infer the frequency or timing of use of either regeneration or non-regeneration modes.

The bore side extend spool 664 is a two-position spring returned, solenoid actuated spool valve defining an extend position (leftmost in FIG. 22A) and a retract position (rightmost in FIG. 22A). When the bore side extend spool 664 is arranged in the extend position (e.g., energized), pressure is vented from a control side of the bore side extend logic valve 668 allowing high pressure hydraulic fluid to act on the bore side of the packer actuators 516. When the bore side extend spool 664 is arranged in the retract position (e.g., de-energized), high pressure hydraulic fluid is provided to the control side of the bore side extend logic valve 668 and the bore side of the packer actuators 516 is vented to the reservoir 644.

The bore side retract spool 672 is a two-position spring returned, solenoid actuated spool valve defining a retract position (leftmost in FIG. 22A) and an extend position (rightmost in FIG. 22A). When the bore side retract spool 672 is arranged in the retract position (e.g., energized), pressure is vented from a control side of the bore side retract logic valve 676 allowing high pressure hydraulic fluid from the bore side of the packer actuators 516 to vent to the reservoir 644. When the bore side retract spool 672 is arranged in the extend position (e.g., de-energized), high pressure hydraulic fluid is provided to the control side of the bore side retract logic valve 676 and the bore side of the packer actuators 516 is isolated from the reservoir 644.

The rod side retract spool 680 is a two-position spring returned, solenoid actuated spool valve defining a regeneration/retract position (leftmost in FIG. 22A) and a normal/ extend position (rightmost in FIG. 22A). When the rod side retract spool 680 is arranged in the regeneration/retract position, pressure is vented from a control side of the rod side retract logic valve 684 allowing high pressure hydraulic fluid from the rod side of the packer actuators 516 to vent to communicate with the first pump 508. When the rod side retract spool 680 is arranged in the normal/extend position, high pressure hydraulic fluid is provided to the control side of the rod side retract logic valve 684 and the rod side of the packer actuators 516 is inhibited from communicating with the first pump 508.

The pump side pressure relief valve 688 is arranged to open when pressure at the first pump 508 exceeds a threshold pressure value.

The normal/regen spool valve 696 is a two-position, spring biased, solenoid actuated spool valve defining a regen extend/retract position (topmost in FIG. 22A) and a normal extend position (bottommost in FIG. 22A). When the normal/regen spool valve 696 is arranged in the regen extend/retract position, hydraulic pressure is inhibited from venting therethrough to the reservoir 644. When the normal/regen spool valve 696 is arranged in the normal extend position, hydraulic pressure is allowed to vent therethrough to the reservoir 644.

Packer System Operable in a Regeneration Mode and a Non-Regeneration Mode

As discussed above, and with reference to FIG. 22A, the first manifold 512 is operable in both a regeneration mode of operation and a non-regeneration or normal mode. In the regeneration mode, the packer actuators 516 are extended when the bore side extend spool 664 and the bore side retract spool 672 are both in the extend positions (e.g., the spool

664 is energized and the spool 672 is de-energized), the rod side retract spool 680 is in the regeneration/retract position (e.g., energized), and the normal/regen spool valve 696 is arranged in the regen extend/retract position (e.g., de-energized). When so arranged, the hydraulic fluid that is evacuating the rod side of the packer actuators 516 during extension is reintroduced into the high pressure hydraulic fluid flow path and added to the volume of hydraulic fluid routed to the bore side of the packer actuators 516. Regeneration mode operation increases the speed at which the packer actuators 516 extend, but is capable of providing less force.

In the normal mode, the packer actuators 516 are extended when the bore side extend spool 664 and the bore side retract spool 672 are both in the extend positions (e.g., the spool 664 is energized and the spool 672 is de-energized), the rod side retract spool 680 is in the normal/extend position (e.g., energized), and the normal/regen spool valve 696 is arranged in the normal extend position (e.g., energized). When so arranged, the hydraulic fluid that is evacuating the rod side of the packer actuators 516 during extension is vented to the reservoir 644. Normal mode operation extends with a lower the speed than the regeneration mode, but is capable of providing more force.

Regeneration operation can be controlled by the control system 506. In some embodiments, the area differential between the rod side and the bore side of the packer actuators 516 defines a force differential given an equal pressure between the rod side and the bore side. The force differential can be used to determine a packing load threshold force. In some embodiments, the control system 506 operates the first manifold 512 in the regeneration mode when the load on the packer actuators 516 is less than the packing load threshold force. The control system 506 operates the first manifold 512 in the normal mode when the load on the packer actuators 516 is equal to or greater than the packing load threshold force. For example, the regeneration mode can be utilized early in a day when little refuse is housed in the storage compartment 130. In some embodiments, the control system 506 operates the first manifold 512 in the normal mode when an amount of refuse (e.g., weight, volume, number of stops, etc.) is above a threshold amount, and in the regeneration mode when the amount of refuse is less than the threshold amount. The high flow logic valves in the first manifold 512 reduce pressure losses across the manifold 512 and increase overall system efficiency.

Figure 22B:
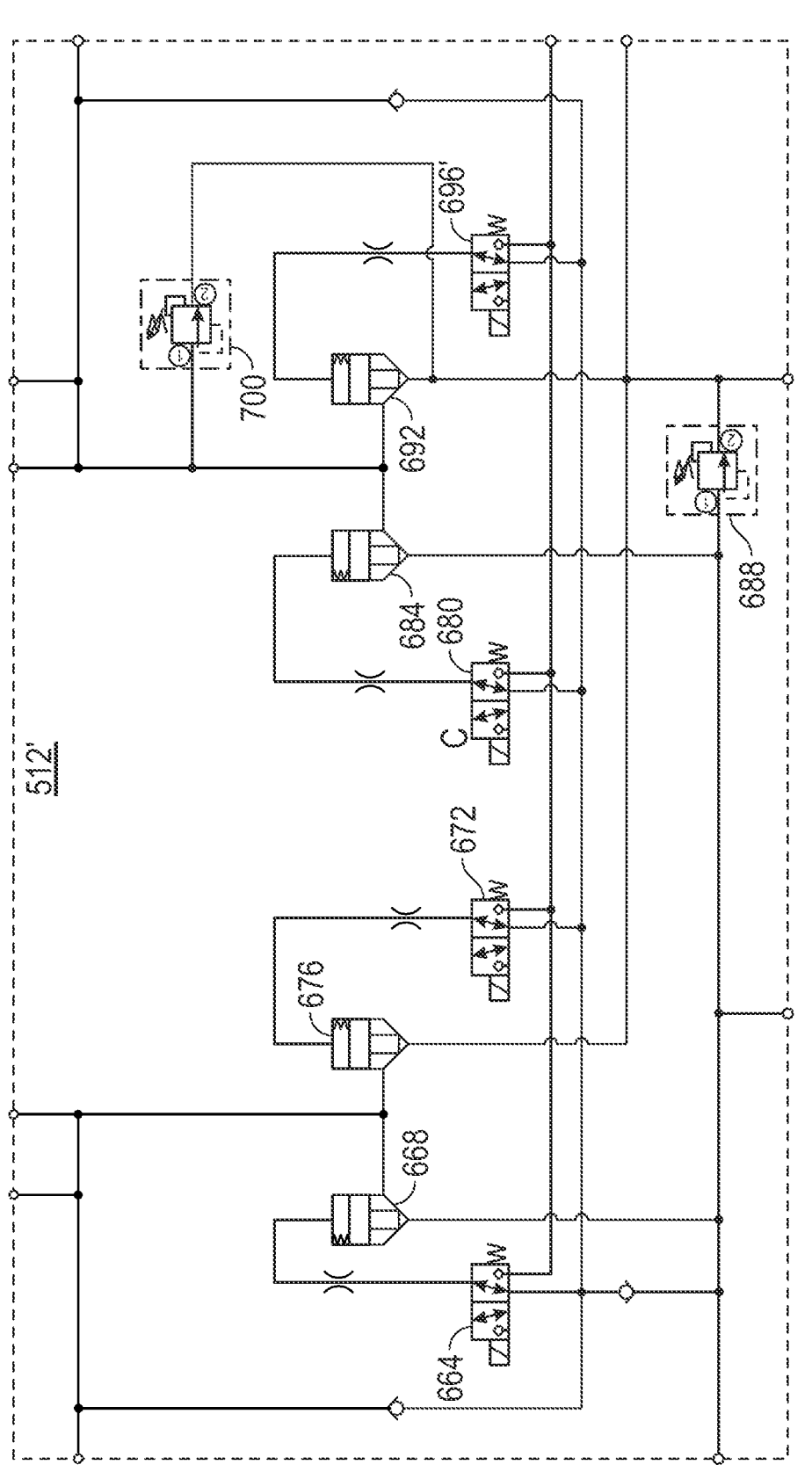
FIG. 22B is a schematic representation of another packer and ejector system of the two-motor, two-pump hydraulic system of FIG. 14, according to an exemplary embodiment.

As shown in FIG. 22B, another embodiment of a first manifold 512' includes similar components to the first manifold 512 described above including the bore side extend spool 664 and the bore side extend logic valve 668; the bore side retract spool 672 and the bore side retract logic valve 676; the rod side retract spool 680 and the rod side retract logic valve 684; the pump side pressure relief valve 688 and a rod side pressure relief logic valve 692; and the rod side pressure relief valve 700. The first manifold 512' defines similar a regeneration mode of operation and a similar normal mode of operation. The first manifold 512' includes a normal/regen spool valve 696' that is a two-position, spring biased, solenoid actuated spool valve defining a regen extend/retract position (rightmost in FIG. 22B) (e.g., de-energized) and a normal extend position (leftmost in FIG. 22B) (e.g., energized). When the normal/regen spool valve 696 is arranged in the regen extend/retract position, hydraulic pressure is communicated between the rod side pressure relief logic valve 692 and the pump 508. When the normal/ regen spool valve 696 is arranged in the normal extend position, hydraulic pressure is allowed to vent therethrough to the reservoir 644. The first manifold 512' functions similarly to the first manifold 512 discussed above.

Speed Control System for a Hydraulic System

It is desirable to improve energy efficiency of the application kit 80 in order to extend the usable energy of the batteries 60 and enable the refuse vehicle 100 to complete a planned route using the batteries' 60 energy. Typical hydraulic systems utilize variable displacement pumps to adjust the hydraulic power provided to the application kit 80. The control system 506 discussed above is structured to control operation of the electric motors (e.g., the first electric motor 504 and the second electric motor 520) and adjust the hydraulic power supplied by altering the speed of operation of the electric motors.

As shown in FIG. 23, a schematic diagram of the control system 506 of the vehicle 100 is shown according to an example embodiment. As shown in FIG. 23, a route and speed controller 704 of the control system 506 includes a processing circuit 708 having a processor 712 and a memory device 716; a speed control system 720 having a packer circuit 724, a door circuit 728, a lift circuit 732, and a speed circuit 736; and a communications interface 740. Generally, the route and speed controller 704 is structured to determine the load requirements of the packer/ejector system 518, the door system 530, and the lift system 542 and adjust the operational speed of the first motor 504 and the second motor 520 to efficiently provide the desired power to the application kit 80. While the route and speed controller 704 is described with respect to the two-motor, two-pump hydraulic system 500, the route and speed controller 704 is operable with one motor, two motor, and three motor systems, as desired.

The packer circuit 724 is structured to determine a packer load on the packer system 518 and control a speed of the first motor 504 to provide a force via the packer actuator 516 to meet the packer load. In some embodiments, the packer circuit 724 is also in communication with the first pump 508 to adjust a displacement of the first pump 508. In some embodiments, the first pump 508 does not employ load sense.

The door circuit 728 is structured to determine a door load on the door system 530 and control a speed of the second motor 520 to provide a force via the top door actuator 532 and/or the tailgate actuator 536 to meet the door load. In some embodiments, the door circuit 728 is also in communication with the second pump 524 to adjust a displacement of the second pump 524.

The lift circuit 732 is structured to determine a lift load on the lift system 542 and control a speed of the second motor 520 to provide a force via the arm lift actuator 544, the arm grab actuator 548, and/or the arm reach actuator 552 to meet the lift load. In some embodiments, the lift circuit 732 is also in communication with the second pump 524 to adjust a displacement of the second pump 524.

Figure 24:
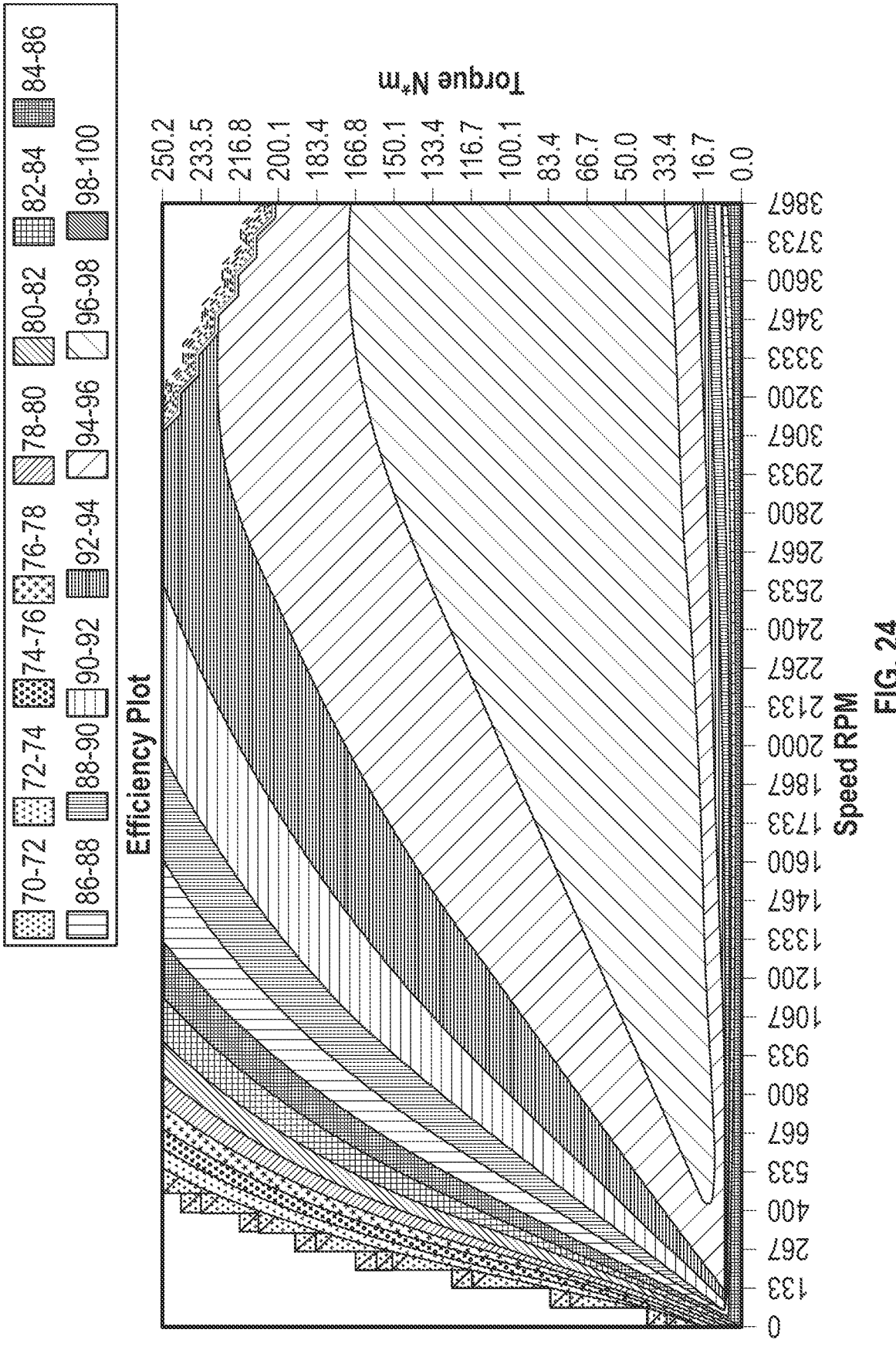
FIG. 24 is a graph showing efficiency bands of motor operation at different speeds and torques for motors of the two-motor, two-pump hydraulic system of FIG. 14, according to an exemplary embodiment.
Figure 25:
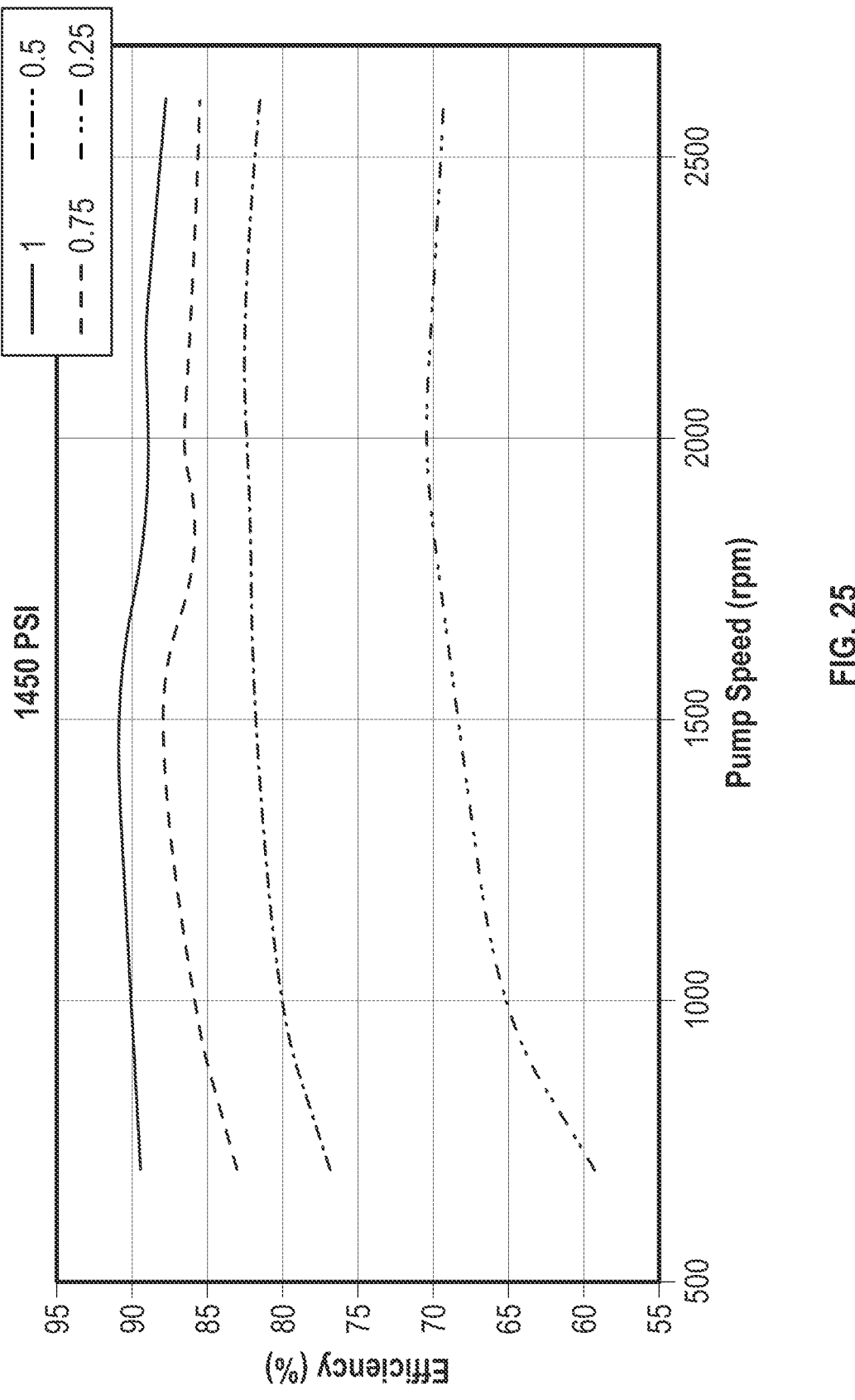
FIG. 25 is a graph showing efficiency of pump operation at different speeds and displacements for pumps of the two-motor, two-pump hydraulic system of FIG. 14, according to an exemplary embodiment.

The speed circuit 736 is structured to communicate with the packer circuit 724, the door circuit 728, and the lift circuit 732 to determine a speed of operation of the first motor 504 and the second motor 520. Typical hydraulic systems do not actively control motor speed. The speed circuit 736 actively modifies (i.e., changes to a desired speed or a requested speed) the speed of the first motor 504 and the second motor 520 to vary the hydraulic power provided to the components of the application kit 80. FIG. 24 shows an efficiency plot of the first motor 504 where the x-axis is motor speed, the y-axis is motor torque, and the colored fields are efficiency bands. FIG. 24 illustrates how a high efficiency can be maintained while varying speed at a constant torque. FIG. 25 shows pump efficiency curves including a x-axis showing pump speed, and a y-axis showing efficiency. The four lines illustrate efficiency at different pump displacements. The efficiency of the first pump 508 and the second pump 524 is highest when operating at maximum displacement, and it is significantly more efficient to vary the motor speed than to adjust the displacement of the pump to achieve the desired force, cycle time, and load capability. The speed circuit can vary the speed of the first motor 504 and/or the second motor 520 based on at least body function activity (e.g., packer actuator 516 extending or retracting) or a load (e.g., a packer load).

In some embodiments, a packer extend speed of the first motor 504 is 2400 rpm and a packer retract speed of the first motor 504 is 1200 rpm. In some embodiments, a top door close speed of the second motor 520 is 2100 rpm and a top door open speed of the second motor 520 is 1100 rpm. In some embodiments, a tailgate open speed of the second motor 520 is 1050 rpm, and a tailgate close speed of the second motor 520 is 700 rpm. In some embodiments, an arm function (individual) speed of the second motor is 2100 rpm, and an arm Lift+Reach (combined) speed of the second motor 520 is 3200 rpm. Other speeds are contemplated and may be implemented, as desired.

Cycle Speed Based Hydraulic Control System

With continued reference to FIG. 23, the route and speed controller 704 further includes a cycle control system 744 having a cycle speed circuit 748. The hydraulic system 500 operates more efficiently at lower speeds (e.g., overall energy consumed to perform an individual body function is the same, but frictional losses are reduced).

The cycle speed circuit 748 is structured to receive a slow cycle command from a user interface 762 or from another circuit or control system of the route and speed controller 704. In some embodiments, the user interface 762 is a manual switch. In some embodiments, the user interface 762 includes a graphical user interface, or another user selectable element. In some embodiments, the user interface 762 allows the operator to select between a fast speed setting and a slow speed setting. The slow cycle command prompts the cycle speed circuit 748 to determine a target cycle time in the form of a maximum cycle time for body functions of the application kit 80. In some embodiments, the maximum cycle time includes a predetermined maximum cycle time for each actuator or system. In some embodiments, the maximum cycle time includes a derated maximum speed of operation for a particular component. For example, the target cycle time can define defines a maximum speed that a user interface can manipulate the hydraulic actuator (e.g., a user can manipulate a joystick or other user interface to manipulate a grabber assembly and the target cycle time limits the speed at which the user can operate the grabber assembly). In some embodiments, the slow cycle command increases the target cycle time but not fully to the maximum possible cycle time. In other words, the speed of operation of the actuators may be reduced (i.e., slower) without forcing operation at the maximum cycle time (i.e., the slowest operation possible by the system). For example, the packer system 518 is associated with a predetermined packer maximum cycle time, the door system 530 is associated with a predetermined door maximum cycle time (e.g., a top door cycle time and a separate tailgate cycle time), and the lift system 542 is associated with a predetermined lift maximum cycle time. During operation, each of the predetermined cycle times can be adjusted based on available energy, location information, and other factors impacting efficiency of operation and the ability of the truck to complete a planned route.

In some embodiments, the cycle speed circuit 748 determines the maximum cycle time (e.g., a reduced speed of hydraulic functions and actuation) based on battery 60 state of charge. For example, the cycle speed circuit 748 may derate all hydraulic function speeds to their respective maximum cycle times when the battery 60 state of charge is equal to or less than a threshold state of charge.

In some embodiments, the cycle speed circuit 748 determines the maximum cycle time based on route information such as a distance between cans (e.g., using route planning features of the route and speed controller 704) to minimize the speed of body functions to take advantage of large distance between some stops. For example, the maximum cycle time can be determined at each stop to maximize the cycle time while ensuring that the body functions are ready to be employed upon arrival at the next stop. In some embodiments, the route information includes map data and determines a distance or a time of travel between containers to be collected. The map data can include global position coordinate (GPS) information, learned routes, platoon information, locations status information historical information, etc. The cycle time can be determined by the cycle speed circuit 748 based on the route information. For example, the cycle time can be maximized based on a projected time to the next stop on the route (e.g., a cycle time of 142 seconds, based on a distance, speed limit, traffic information, historical information, etc.).

In some embodiments, the cycle speed circuit 748 provides a load shedding mode wherein the cycle time is maximized and actuation speeds are reduced (e.g., a reduced packing speed) when the hydraulic system 500 is approaching maximum allowable power threshold (e.g., when operating multiple components at the same time). In some embodiments, the cycle speed circuit 748 determines a total electrical power load on the hydraulic system 500 and compares the power load to a threshold power load. When the power load exceeds the threshold power load, the cycle speed circuit 748 will increase cycle times, and/or inhibit body functions to lower the power load.

In some embodiments, the cycle speed circuit 748 determines the cycle time and provides the cycle time to the speed control system 720. The speed control system 720 then controls operation of the individual actuators via speed control of the first electric motor 504 and the second electrical motor 520 to achieve the determined cycle time.

In some embodiments, the cycle speed circuit 748 will not derate or maximize cycle time for the lift system 542. In some embodiments, when the state of charge of the batteries 60 is equal to or less than a predetermined threshold, the cycle speed circuit 748 may slow all functions to the maximum cycle time, or disable body functions of the application kit 80 to allow the refuse vehicle 100 to return to base for recharging. In some embodiments, the cycle speed circuit 748 reduces an actuation speed of one or more actuators (i.e., increasing cycle time) to maximize a total remaining range of the vehicle 10.

Integrated Route Planning and Hydraulic Control System

With continued reference to FIG. 23, the route and speed controller 704 further includes a route control system 766 having a location circuit 770 and a route circuit 774. The location circuit 770 is structured to receive location information from a GPS device 778 including global positioning system coordinates. The route circuit 774 is structured to access map information stored in the memory device 716 concerning a stored route of the refuse vehicle 100. The map information can include a map of streets, alleys, or other roadways that the refuse vehicle 100 will travel to complete the route and an order of stops indicated in the map information. Each stop can include stop information including, but not limited to, a container type (e.g., a residential can, a dumpster, etc.) a distance to the next stop, and a stop preference (e.g., an aggressive dog lives at the stop, the can is often overfilled, etc.). The route circuit 774 receives the location information from the location circuit 770 and determines the refuse vehicle's 100 position on the route.

In some embodiments, the route circuit 774 determines a number of stops remaining on the route, and projects the electrical power required to complete the route. In some embodiments, the route circuit 774 can collect historical information (e.g., logging information on each trip along a route) to improve the route information. The route information can include the historical information on future trips along the route to improve the accuracy of predictions, and responses.

In some embodiments, the collecting or learning route information includes determining an identity of a driver or operator, or a specific team of operators, and tracking the performance of the individuals or team of individuals along the route. The route circuit 774 may collect information including energy efficiency, speed of completion of the route, a deviation from a target time of completion of the route, etc. In some embodiments, each individual refuse vehicle 100 may also be tracked or learned and information regarding the operation of the refuse vehicle 100 is tracked over time. In some embodiments, each operator, operator team, route, and truck are given scores or parameter sets that indicate operational characteristics. Operational characteristics may be used to identify ideal matches of operator teams, routes, and specific refuse vehicles 100. Ideally matched operator teams and refuse vehicles 100 along efficiency conducive routes may lead to more efficient operation and an increased likelihood of completing a target route without fully depleting the batteries 60.

In some embodiments, the route circuit 774 utilizes the route information and the learned operational characteristics to determine a predicted energy required to complete the route. If the predicted energy to complete the route is greater than the available state of charge of the batteries 60, then the route circuit 774 will provide instructions to the cycle control system 744 to implement maximum, or increased, cycle times where available to increase the energy efficiency of the refuse vehicle 100 and increase the likelihood of completing the route. The route information can also include traffic information, weather information, and other information that could affect the ability of the refuse vehicle 100 to complete the route.

In some embodiments, when the state of charge of the battery falls below a predetermined threshold, the route circuit 774 will inhibit lift system 542 operation to inhibit the operators from collecting additional refuse. The user interface 762 will then prompt the operator to return to the landfill, dump the load, and return to base for charging. The predetermined threshold is a dynamic threshold determined by the route circuit 774 based on the remaining route (e.g., distance, altitude changes, curvature of the road, road conditions, etc.), the weight of refuse, and the current operating characteristics of the driver and/or refuse vehicle 100.

In some embodiments, the route circuit 774 is also structured to identify and stop on the route using the location information provided by the location circuit 770, and automatically adjust the application kit 80 to achieve stop parameters. For example, on a front-loading refuse vehicle 100 a height and width of the lift forks 146 can be adjusted for each specific stop without input from the operator team. In some embodiments, the stop parameters can be provided to the operators via a display or other user interface to improve the operator's ability to correctly adjust the lift system 542 for each container at each stop. In some embodiments, the operators enter the stop parameters during operation in a learning mode (e.g., a button press when forks 146 are at the correct height/width for each stop) and stop parameters are recorded in association with each location/customer. The ability to record and reproduce stop parameters based on map information, location information and other route information can greatly improve the efficiency of a total route because the lifting assembly 542 is already correctly configured upon arrival at a stop, or is very efficiently and quickly adjusted at the time of arrival at a stop.

In one configuration, the speed control system 720, cycle control system 744, and the route control system 766 are embodied as machine or computer-readable media that is executable by a processor, such as processor 712. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the speed control system 720, cycle control system 744, and the route control system 766 are embodied as hardware units, such as electronic control units. As such, the speed control system 720, cycle control system 744, and the route control system 766 may be embodied as one or more circuitry components including, but not limited to, processing circuitry, network interfaces, peripheral devices, input devices, output devices, sensors, etc. In some embodiments, the speed control system 720, cycle control system 744, and the route control system 766 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the speed control system 720, cycle control system 744, and the route control system 766 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The speed control system 720, cycle control system 744, and the route control system 766 may also include programmable hardware devices such as field programmable gate arrays, programmable array logic, programmable logic devices or the like. The speed control system 720, cycle control system 744, and the route control system 766 may include one or more memory devices for storing instructions that are executable by the processor(s) of the speed control system 720, cycle control system 744, and the route control system 766. The one or more memory devices and processor(s) may have the same definition as provided below with respect to the memory device 716 and processor 712. In some hardware unit configurations, the speed control system 720, cycle control system 744, and the route control system 766 may be geographically dispersed throughout separate locations in the vehicle. Alternatively and as shown, the speed control system 720, cycle control system 744, and the route control system 766 may be embodied in or within a single unit/housing, which is shown as the route and speed controller 704.

In the example shown, the route and speed controller 704 includes the processing circuit 708 having the processor 712 and the memory device 716. The processing circuit 708 may be structured or configured to execute or implement the instructions, commands, and/or control processes described herein with respect to the speed control system 720, cycle control system 744, and the route control system 766. The depicted configuration represents the speed control system 720, cycle control system 744, and the route control system 766 as machine or computer-readable media. However, as mentioned above, this illustration is not meant to be limiting as the present disclosure contemplates other embodiments where the speed control system 720, cycle control system 744, and the route control system 766, or at least one circuit of the speed control system 720, cycle control system 744, and the route control system 766, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 712) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the speed control system 720, cycle control system 744, and the route control system 766) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 716 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 716 may be communicably connected to the processor 712 to provide computer code or instructions to the processor 712 for executing at least some of the processes described herein. Moreover, the memory device 716 may be or include tangible, non-transient volatile memory or non-volatile memory. Accordingly, the memory device 716 may include database components, object code components, script components, or any other type of information structure for supporting the various activities and information structures described herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 23, it should be understood that the route and speed controller 704 may include any number of circuits for completing the functions described herein. For example, the activities and functionalities of the speed control system 720, cycle control system 744, and the route control system 766 may be combined in multiple circuits or as a single circuit. Additional circuits with additional functionality may also be included. Further, the route and speed controller 704 may further control other activity beyond the scope of the present disclosure.

As mentioned above and in one configuration, the "circuits" may be implemented in machine-readable medium for execution by various types of processors, such as the processor 712 of FIG. 23. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
an electric motor powered by a battery;
a hydraulic pump driven by the electric motor;
a hydraulic actuator powered by the hydraulic pump; and
one or more processing circuits comprising one or more memory devices coupled to one or more processors, the one or more memory devices configured to store instructions thereon that, when executed by the one or more processors, cause the one or more processors to:
determine a location of the refuse vehicle including a global position system coordinate;
determine a position on a route map and a projected time to a next stop along a route using the location;
determine a state of charge of the battery and a threshold for the state of charge below which operation of the hydraulic actuator is adjusted;
dynamically update the threshold based on the position on the route map or a weight of refuse in a refuse compartment; and
control the electric motor to change a cycle time of the hydraulic actuator when the state of charge is less than the threshold and based on the projected time to the next stop.

2. The refuse vehicle of claim 1, wherein the one or more memory devices are further configured to store instructions thereon that, when executed by the one or more processors, cause the one or more processors to:
inhibit operation of the hydraulic actuator when the state of charge is less than the threshold and based on the position on the route map.

3. The refuse vehicle of claim 1, wherein the one or more memory devices are further configured to store instructions thereon that, when executed by the one or more processors, cause the one or more processors to:
recognize stored stop parameters based on the position on the route map;
control the hydraulic actuator based on the position on the route map; and
adjust the hydraulic actuator to achieve the stop parameters.

4. The refuse vehicle of claim 3, wherein the stop parameters include at least one of a container type, a fork width, or a fork height.

5. The refuse vehicle of claim 4, wherein the stop parameters are displayed on a user interface.

6. The refuse vehicle of claim 1, wherein the one or more memory devices are further configured to store instructions thereon that, when executed by the one or more processors, cause the one or more processors to control the hydraulic actuator based on the position on the route map.

7. The refuse vehicle of claim 1, wherein the hydraulic actuator is a packer hydraulic actuator that controls actuation of a packer assembly or an arm actuator configured to power operation of at least one component of a lift system of the refuse vehicle, and wherein the cycle time includes a maximum speed of operation of the packer hydraulic actuator or the arm actuator.

8. A refuse vehicle comprising:
an electric motor powered by a battery;
a hydraulic pump driven by the electric motor;
a hydraulic actuator powered by the hydraulic pump; and
one or more processing circuits comprising one or more memory devices coupled to one or more processors, the one or more memory devices configured to store instructions thereon that, when executed by the one or more processors, cause the one or more processors to:
determine a location of the refuse vehicle including a global position system coordinate;
determine a position on a route map and a projected time to a next stop along a route using the location;
recognize stored stop parameters based on the position on the route map, the stop parameters including information indicative of a fork width or a fork height that is associated with refuse collection stops corresponding with the position; and control the hydraulic actuator, using the electric motor, based on the position on the route map and the projected time to the next stop to achieve the fork width or the fork height.

9. The refuse vehicle of claim 8, wherein the stop parameters also include a container type.

10. The refuse vehicle of claim 9, wherein the one or more memory devices are further configured to display the stop parameters on a user interface.

11. The refuse vehicle of claim 8, wherein the one or more memory devices are further configured to store instructions thereon that, when executed by the one or more processors, cause the one or more processors to:

determine a state of charge of the battery; and change a cycle time of the hydraulic actuator when the state of charge is less than a threshold and based on the position on the route map.

12. The refuse vehicle of claim 11, wherein the one or more memory devices are further configured to store instructions thereon that, when executed by the one or more processors, cause the one or more processors to:

dynamically update the threshold based on the position on the route map or a weight of refuse in a refuse compartment.

13. The refuse vehicle of claim 8, wherein the one or more memory devices are further configured to store instructions thereon that, when executed by the one or more processors, cause the one or more processors to control the hydraulic actuator based on the position on the route map.

14. A refuse vehicle comprising:

an electric motor powered by a battery;

a hydraulic pump driven by the electric motor;

a hydraulic actuator powered by the hydraulic pump; and one or more processing circuits comprising one or more memory devices coupled to one or more processors, the one or more memory devices configured to store instructions thereon that, when executed by the one or more processors, cause the one or more processors to:

determine a position on a route map and a projected time to a next stop along a route based on the route map;

determine a state of charge of the battery; and control the electric motor to change a cycle time of the hydraulic actuator when the state of charge is less than a threshold and based on the projected time to the next stop.

15. The refuse vehicle of claim 14, wherein the one or more memory devices are further configured to store instructions thereon that, when executed by the one or more processors, cause the one or more processors to:

recognize stored stop parameters based on the position on the route map, and control the hydraulic actuator based on the position on the route map and adjusting the hydraulic actuator to achieve the stop parameters.

16. The refuse vehicle of claim 15, wherein the stop parameters include at least one of a container type, a fork width, or a fork height.

17. The refuse vehicle of claim 16, wherein the stop parameters are displayed on a user interface.

18. The refuse vehicle of claim 14, wherein the one or more memory devices are further configured to store instructions thereon that, when executed by the one or more processors, cause the one or more processors to:

dynamically update the threshold based on the position on the route map or a weight of refuse in a refuse compartment.

19. The refuse vehicle of claim 14, wherein the one or more memory devices are further configured to store instructions thereon that, when executed by the one or more processors, cause the one or more processors to:

inhibit operation of the hydraulic actuator when the state of charge is less than the threshold and based on the position on the route map.

20. The refuse vehicle of claim 14, wherein the one or more memory devices are further configured to store instructions thereon that, when executed by the one or more processors, cause the one or more processors to control the hydraulic actuator based on the position on the route map.

* * * * *